US008568225B2

(12) United States Patent
Morrow et al.

(10) Patent No.: US 8,568,225 B2
(45) Date of Patent: Oct. 29, 2013

(54) USER INTERFACE SYSTEM AND METHOD FOR CREATING AND VERIFYING SIGNED CONTENT

(75) Inventors: James W. Morrow, Sparks, NV (US); Carmen DiMichele, Sparks, NV (US); Daniel D. Kopycienski, Tucson, AZ (US)

(73) Assignee: Bally Gaming, Inc., Las Vegas, NV (US)

( * ) Notice: Subject to any disclaimer, the term of this patent is extended or adjusted under 35 U.S.C. 154(b) by 1530 days.

(21) Appl. No.: 11/225,494

(22) Filed: Sep. 12, 2005

(65) Prior Publication Data

US 2006/0100011 A1 May 11, 2006

Related U.S. Application Data

(63) Continuation-in-part of application No. 10/943,771, filed on Sep. 16, 2004.

(51) Int. Cl.
*A63F 13/00* (2006.01)
*G06F 9/44* (2006.01)

(52) U.S. Cl.
USPC .................. 463/29; 463/30; 463/31; 463/42; 717/101

(58) Field of Classification Search
USPC ................................ 463/29-31, 42; 717/101
See application file for complete search history.

(56) References Cited

U.S. PATENT DOCUMENTS 5,655,961 A 8/1997 Acres et al.
5,702,304 A 12/1997 Acres et al.
5,741,183 A 4/1998 Acres et al.
5,752,882 A 5/1998 Acres et al.
5,820,459 A 10/1998 Acres et al.
5,836,817 A 11/1998 Acres et al.
6,026,433 A * 2/2000 D'Arlach et al. ............ 709/217
6,071,190 A 6/2000 Weiss et al.
6,135,884 A 10/2000 Hedrick et al.
6,162,122 A 12/2000 Acres et al.
6,244,958 B1 6/2001 Acres
6,257,981 B1 7/2001 Acres et al.

(Continued)

OTHER PUBLICATIONS

Advertisement in Gaming Products & Services/Bingo Manager Magazine, Table of Contents, vol. 5, No. 7, Jul. 1997.

(Continued)

*Primary Examiner* — Lawrence Galka
(74) *Attorney, Agent, or Firm* — Brooke Quist; Marvin Hein

(57) ABSTRACT

An embedded additional user interface 10 includes a web page display screen 20 and an embedded processor 30, and is incorporated into a gaming machine 40 that in turn includes a gaming screen 50 and a gaming processor 60. Because of security procedures applied for digital signing and certification of user selectable programming elements, the embedded additional user interface 10 employs an interface build application 79 such that the user can select and modify the look and feel of the web page display screen content. The interface build application enables content to be presented on a web page display screen that can track to an individual player. The interface build application also enables a casino user to update current casino promotions for its players in a timely manner, as well as present customized marketing messages, which can even be targeted to individual players. The casino user can customize the look and feel of web page display screen content to make the game player environment more exciting and more conducive to extended player gaming sessions.

25 Claims, 18 Drawing Sheets

(56) References Cited

U.S. PATENT DOCUMENTS

| | | | | |
|---|---|---|---|---|
| 6,267,675 | B1 | 7/2001 | Lee | |
| 6,315,666 | B1 | 11/2001 | Mastera et al. | |
| 6,364,769 | B1 | 4/2002 | Weiss et al. | |
| 6,367,016 | B1 * | 4/2002 | Lambert et al. | 713/185 |
| 6,375,567 | B1 | 4/2002 | Acres | |
| 6,431,983 | B2 | 8/2002 | Acres | |
| 6,457,099 | B1 | 9/2002 | Gilbert | |
| RE37,885 | E | 10/2002 | Acres et al. | |
| 6,652,378 | B2 | 11/2003 | Cannon et al. | |
| 6,712,698 | B2 | 3/2004 | Paulsen et al. | |
| 6,722,986 | B1 | 4/2004 | Lyons et al. | |
| 6,908,391 | B2 | 6/2005 | Gatto et al. | |
| 6,916,247 | B2 | 7/2005 | Gatto et al. | |
| 7,294,056 | B2 * | 11/2007 | Lowell et al. | 463/17 |
| 2002/0111206 | A1 | 8/2002 | Van Baltz et al. | |
| 2002/0126846 | A1 * | 9/2002 | Multerer et al. | 380/251 |
| 2003/0054868 | A1 * | 3/2003 | Paulsen et al. | 463/1 |
| 2003/0100370 | A1 * | 5/2003 | Gatto et al. | 463/42 |
| 2003/0145205 | A1 * | 7/2003 | Sarcanin | 713/172 |
| 2003/0195033 | A1 * | 10/2003 | Gazdic et al. | 463/20 |
| 2003/0216172 | A1 * | 11/2003 | LeMay et al. | 463/29 |
| 2003/0233561 | A1 * | 12/2003 | Ganesan et al. | 713/193 |
| 2004/0100490 | A1 | 5/2004 | Boston et al. | |
| 2004/0216084 | A1 * | 10/2004 | Brown et al. | 717/102 |
| 2004/0225894 | A1 * | 11/2004 | Colvin | 713/200 |
| 2005/0229005 | A1 * | 10/2005 | Le Saint et al. | 713/185 |

OTHER PUBLICATIONS

International Search Report of PCT/US05/32809, dated Feb. 1, 2006.

International Search Report of PCT/US05/33016, dated Feb. 8, 2006.

* cited by examiner

USER INTERFACE SYSTEM AND METHOD FOR CREATING AND VERIFYING SIGNED CONTENT

RELATED APPLICATIONS

This application is a continuation-in-part of U.S. patent application Ser. No. 10/943,771 filed Sep. 16, 2004, entitled USER INTERFACE SYSTEM AND METHOD FOR A GAMING MACHINE, which is hereby incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a gaming system that incorporates an additional user interface, and more particularly, to a system and methodology that integrates an embedded additional user interface having an animation-capable display screen into a gaming machine.

BACKGROUND OF THE INVENTION

Traditionally, gaming machines have been designed for gaming purposes only. In this regard, gaming machines have been constructed only to include gaming functionality. Recently, however, casino owners have become aware that by adding additional features to gaming machines, they may be able to maintain a player's attention to the gaming machines for longer periods of time. This, in turn, leads to the player wagering at the gaming machine for longer periods of time, thereby increasing casino profits.

One technique that has been employed to maintain a player's attention at the gaming machine has been to provide players with access to gambling-related information. By attaching a small electronic display to the gaming device, gambling-related information, as well as news and advertisements can be sent to the player. The gambling-related information may include, for example, information on sports betting and betting options for those sporting events. Additionally, the gambling-related information may also include information such as horse racing and off-track betting. News and advertisements can also maintain a player's attention by providing the player with access to information ranging from show times, to restaurant and hotel specials, and to world events, thus reducing the need and/or desire for the player to leave the gaming machine.

Moreover, it would be desirable to provide the player with interactive access to the above information. This type of interactivity would allow players significantly more flexibility to make use of the above-described information. The gambling-related information could also be utilized by the player in a much more efficient manner. In this regard, greater levels of flexibility and access are likely to make a player remain and gamble at the gaming machine for significantly longer periods of time. Unfortunately, the system components that are currently utilized for displaying and accessing this type of information, such as external keypads and display modules, are extremely limited in the functionality and capabilities that they provide, thus limiting the success of their ability to maintain a player's attention.

As stated above, attempts to distribute gambling-related information and advertisements to players, has typically required additional system components to be attached to the gaming devices separately and apart from the construction of the gaming machine itself. Specifically, these components for accessing and displaying information from gaming machines have been extremely limited in their usefulness because of the lack of capabilities inherent in these components. Such components have generally included a keypad, card reader, and display equipment, such as a 2-line LED display. It would be desirable for these components to be integrated into the gaming device itself, in a more unified fashion to provide substantially greater functionality than that which has been previously available.

Accordingly, those skilled in the art have long recognized the need for a system that is capable of integrating expanded service and systems capabilities with the more traditional function of a gaming device. The claimed invention clearly addresses these and other needs.

SUMMARY OF THE INVENTION

Briefly, and in general terms, the claimed invention resolves the above and other problems by providing an embedded additional user interface for use in a gaming machine, wherein the gaming machine includes a gaming screen and a gaming processor. More particularly, the embedded additional user interface includes a web content-capable display screen and an embedded processor. Preferably, the web content-capable display screen presents web information to a user via the display screen. The embedded processor preferably utilizes an internal operating system and communicates with the gaming processor. Preferably, the embedded processor reads incoming data, translates the data into a web protocol (web authoring language), if necessary, and maps the data to the web content-capable display screen. In this manner, the web content-capable display screen increases user excitement by providing a richer gaming experience.

In accordance with another aspect of a preferred embodiment, the incoming data received by the embedded additional user interface are $I^2C$ messages (or other serial communications). Preferably, the embedded processor communicates with the gaming processor, and/or other connected devices, over an $I^2C$ bus (or other serial communications bus). The web content-capable display screen of the embedded additional user interface is preferably a color graphic touch screen display. Preferably, the embedded processor is at least a 32-bit processor. Further, the internal operating system of an embedded additional user interface is preferably customized to match the specific hardware to which the internal operating system attaches.

In accordance with another aspect of a preferred embodiment, the embedded processor utilizes cryptographic technology. In one preferred embodiment, a certification process is offered for authentication and non-repudiation of the web content. Preferably, the certification process provides auditability and traceability. Specifically, the certification process provides sufficient security for gaming regulators to allow casino operators to design their own content.

In accordance with another aspect of a preferred embodiment, HTML is the web protocol into which the incoming data is translated in the embedded additional user interface. In another preferred embodiment, DHTML is the web protocol into which the incoming data is translated in the embedded additional user interface. In still another preferred embodiment, XML is the web protocol into which the incoming data is translated in the embedded additional user interface. In yet another preferred embodiment, MACROMEDIA FLASH animation technology is the web protocol into which the incoming data is translated in the embedded additional user interface. In one preferred embodiment, the embedded additional user interface connects to an Ethernet-networked backbone. Further, in one preferred embodiment, the embedded additional user interface connects to a web server through an Ethernet-networked backbone.

In another preferred embodiment, the embedded additional user interface includes an animation-capable display screen and an embedded processor. In yet another preferred embodiment, the embedded additional user interface includes a web page display screen and an embedded processor. In still another preferred embodiment, the embedded additional user interface includes a multimedia display screen and an embedded processor.

In accordance with another preferred embodiment, the claimed invention is directed towards an embedded additional user interface that is incorporated into a gaming machine that includes a separate gaming screen (or gaming region, e.g., spinning reels). The embedded additional user interface includes a web content-capable display screen and an embedded processor. Preferably, the web content-capable display screen presents web information to a user via the display screen. The embedded processor preferably utilizes an internal operating system. The embedded processor reads incoming data, translates the data into a web protocol (web authoring language), if necessary, and maps the data to the web content-capable display screen. Furthermore, in this preferred embodiment the embedded processor additionally includes standard gaming processor functionality, and as such, replaces the standard gaming processor in the gaming machine.

In accordance with another preferred embodiment, the claimed invention is directed towards a gaming machine that includes an embedded additional user interface having a web page display screen. Preferably, the gaming machine includes a gaming display screen, a gaming processor, and an embedded additional user interface. The embedded additional user interface further includes the same web page display screen and an embedded processor that has been described above.

In accordance with another preferred embodiment, the claimed invention is directed towards a method for increasing user excitement relating to a gaming machine by providing a richer gaming experience via an embedded additional user interface that is incorporated into the gaming machine. Preferably, the embedded additional user interface includes an embedded processor and a web page display screen. The method preferably includes: receiving a serial data message containing enhanced player information over a serial communication bus (e.g., an $I^2C$ bus) in the embedded additional user interface; translating the data message into a web authoring language, if necessary; and mapping the data message to the web page display screen, wherein the display screen presents web page information to a user via the display screen.

In one preferred embodiment, the web content is protected by digital signature verification using DSA (Digital Signature Algorithm) or RSA (Rivest-Shamir-Adleman) cryptographic technology. In this regard, the content is preferably protected using digital signature verification so that any unauthorized changes are easily identifiable. Of course, other suitable protection techniques may also be used in other preferred embodiments.

Still further, one preferred embodiment utilizes a Message Authentication Code (MAC), which may be used to verify both the content integrity and the authenticity of a message. A Message Authentication Code can be generated faster than using digital signature verification technology, although it is not as robust. In one preferred embodiment, the authentication technique utilized is a bKey (electronic key) device. A bKey is an electronic identifier that is tied to a particular individual.

Typically, in a preferred embodiment, the data is authenticatible and non-repudiatible, rather than hidden or otherwise obfuscated (encrypted). Non-repudiation is a way to guarantee that the sender of a message cannot later deny having sent the message, and that the recipient cannot deny having received the message.

In accordance with one preferred embodiment, one or more gaming machine system or embedded additional user interface components (or content) are assigned identification codes. The components are grouped together into a protected group of component bindings using cryptographic security procedures and the identification codes of the components in the bindings group. Accordingly, the bindings prevent falsification or repudiation of content entries with respect to any modifications or replacements of components or content within the bindings group.

In accordance with another aspect of a preferred embodiment, every content entry must be authenticated by being digitally signed with a Hashed Message Authorization Code that is based on the entry itself and on the individual identification codes of the components and content in the bindings group. In the same manner, every entry that attempts a replacement of any of the embedded additional user interface components or content must be authenticated by being digitally signed with a Hashed Message Authorization Code that is based on the entry itself and on the individual identification codes of the components and content in the bindings group.

Preferably, the identification codes of the embedded additional user interface components are randomly or pseudo-randomly generated. In accordance with another aspect of the verification system, a Hashed Message Authorization Code key for authenticating access to the component bindings is produced using a SHA-1 hash that is generated using the individual identification codes of the components in the bindings group. Additionally, the embedded additional user interface components are secured within the component bindings using a SHA-1 hash that is generated using the individual identification codes of the components and content in the bindings group.

In accordance with another aspect of a preferred embodiment, the embedded additional user interface includes an interface builder application that is accessible via an attachable laptop computer (or other portable computing device). The interface builder application is rendered secure by enforcing security techniques including by way of example only, and not by way of limitation: encryption, digital signature verification, non-repudiation, hashed authentication coding, and bindings. Through the use of the interface builder application, a user may create original content, as well as modify the existing graphics of the gaming machine environment.

In accordance with this aspect of a preferred embodiment, a user such as a casino operator may build a completely custom display or may select from a combination of different colors, arrangement of buttons, and messages. Additionally, a user may select from one of a plurality of previously created appearances, referred to herein as interface overlays.

Other features and advantages of the claimed invention will become apparent from the following detailed description when taken in conjunction with the accompanying drawings, which illustrate by way of example, the features of the claimed invention.

DETAILED DESCRIPTION OF THE PREFERRED EMBODIMENTS

A preferred embodiment of the embedded additional user interface, constructed in accordance with the claimed invention, is directed towards the integration of an embedded additional user interface into a gaming machine to increase user excitement by providing a richer gaming experience. The embedded additional user interface provides enhanced player satisfaction and excitement, as well as improved gaming device reliability, interactivity, flexibility, security, and accountability. The user interface is sometimes referred to herein as "additional" in that the user interface is separate from the gaming screen (or other gaming presentation). Further, the user interface is sometimes referred to herein as "embedded" in that the user interface includes its own processor in some preferred embodiments of the invention.

Figure 1:
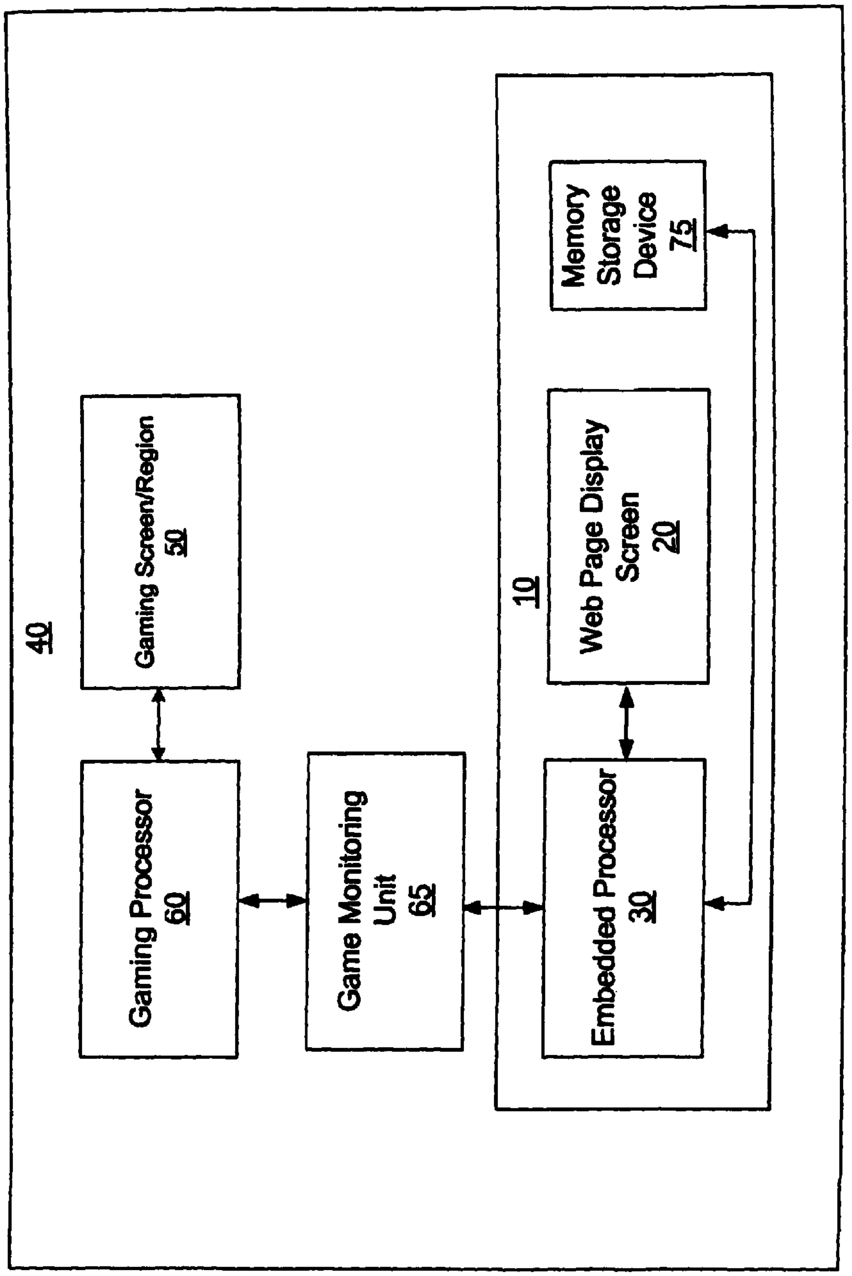
FIG. 1 illustrates a relational diagram of an embedded additional user interface, constructed in accordance with the claimed invention, utilizing a web page display screen and an embedded processor that receives data messages from a game monitoring unit that are translated into web page content and mapped to the web page display screen.

Referring now to the drawings, wherein like reference numerals denote like or corresponding parts throughout the drawings and, more particularly to FIGS. 1-5, there is shown one embodiment of an embedded additional user interface 10. Specifically, FIG. 1 shows an embedded additional user interface 10 that includes a web page display screen 20 and an embedded processor 30. The user interface 10 is incorporated into a gaming machine 40 that, in turn, includes a gaming screen 50, (and/or non-screen gaming region 50, e.g., spinning reels or other gaming presentation) gaming processor 60, and a game monitoring unit 65. The embedded processor 30 employs an internal operating system and communicates with the gaming processor 60. The embedded processor 30 reads incoming data, translates the data into a web authoring language, and maps the data to the web page display screen 20. The display screen 20 presents web page information to a user via the display screen, thereby increasing user excitement by providing a richer gaming experience. The game monitoring unit 65 monitors the information that is input through the user interface 10. This provides a dramatic improvement over traditional system components 70 (input/output peripherals, such as 2-line, 20 character VF (Vacuum Fluorescent) displays and 12-digit keypads) that have been used as in the past to provide user information. The user interface 10 communicates with the game monitoring unit 65 in the same manner as the previous system components 70 communicated with the game monitoring unit.

Figure 2:
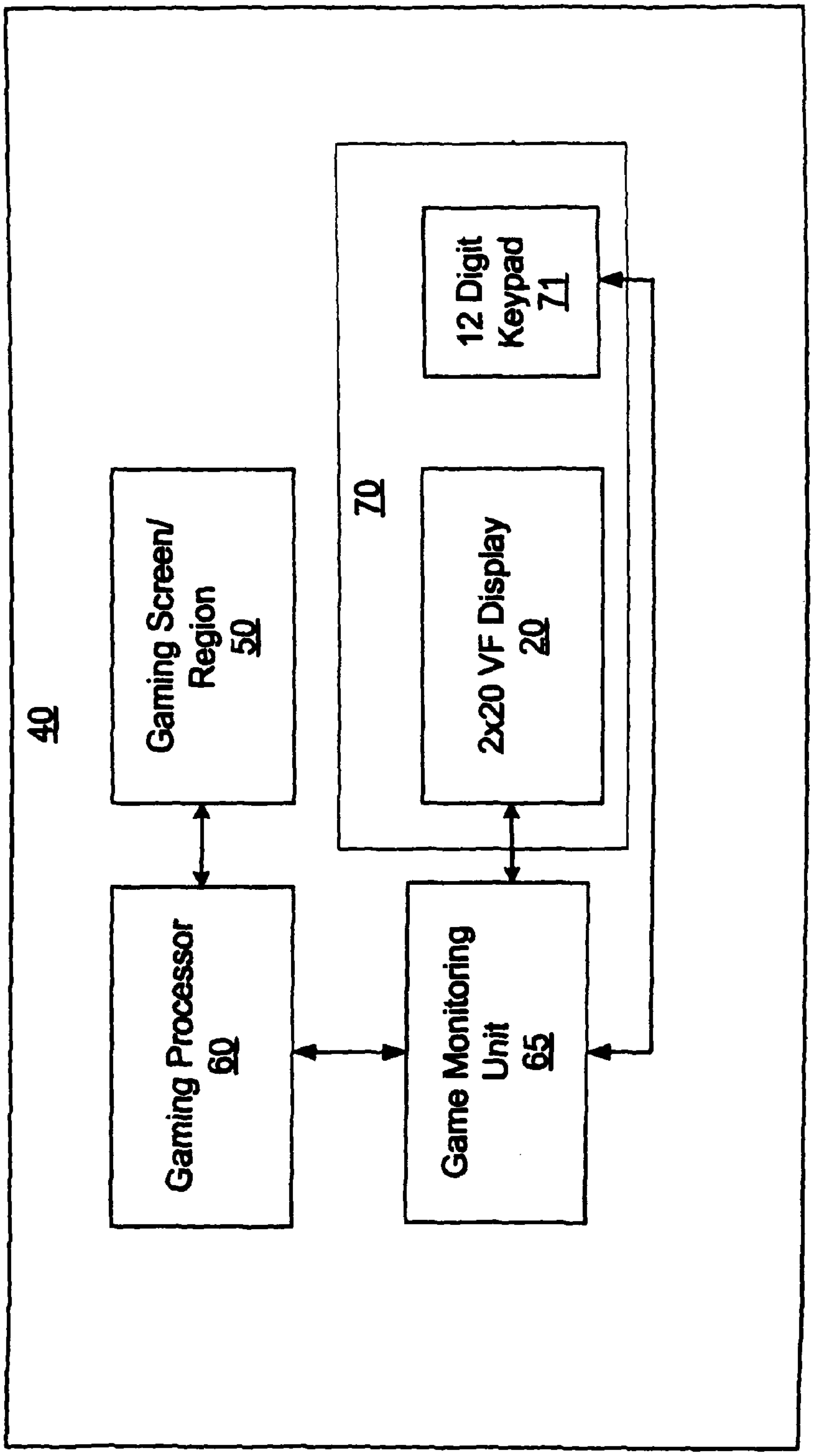
Fig. 2 (Prior Art)
FIG. 2 illustrates a relational diagram of a prior art gaming system that utilizes a 2×20 VF display and 12-digit keypad.

As shown in FIG. 2, prior art gaming devices typically utilized a single video display screen as a gaming screen 50 for the gaming machine 40, while additional system components 70 were attached or juxtapositioned next to the gaming machine. However, in a preferred embodiment of the claimed invention, the system components 70 that were used in prior art systems are replaced with the embedded additional user interface 10 to provide the advanced functionality of a web page display screen 20. Such functionality includes, by way of example only, and not by way of limitation, the ability to display animation, multimedia, and other web-type content. The embedded additional user interface 10 enables presentation of additional information (e.g., enhanced player information) to a player (or potential player) through the web page display screen 20 in an exciting, eye-catching format, while not interfering with the normal gaming processes being displayed on the gaming screen 50. Further, the embedded additional user interface 10 does not interfere with the normal gaming hardware in the gaming machine 40, but rather is easily integrated into a gaming machine 40.

Referring again to FIG. 1, in situations involving multiple gaming machine (or gaming component) manufactures, an embedded additional user interface 10 can be incorporated into a gaming machine (either originally or by retrofitting) without requiring access to the game logic or other gaming systems that might be proprietary and inaccessible with a gaming machine from another gaming manufacturer. Thus, in a preferred embodiment of the claimed invention, the embedded additional user interface 10, which includes a web page display screen 20 for presenting supplementary information to a player, is incorporated into a gaming machine 40 in addition to the standard gaming screen 50 typically found in a gaming machine. The embedded additional user interface 10 may also be incorporated into a gaming machine 40 that utilizes a gaming region (e.g., a reel-spinner) instead of a standard gaming screen 50. This supplemental information may include general gaming information, player-specific information, player excitement and interest captivation content, advertising content (targeted or otherwise), and the like. Further, in other preferred embodiments, the embedded additional user interface 10 may have the ability to interact with the game logic of the gaming processor 60, and thus, provide further functionality, such as bonus games and/or the ability to incorporate awards, promotional offers, or gifts from the web page display screen 20 to the gaming screen 50. Moreover, the web page display screen 20 may display supplemental information in an "attract mode" when there is no game play occurring.

In a preferred embodiment of the claimed invention, the embedded additional user interface 10 is used to make casino services more accessible and friendly to casino patrons. In one preferred embodiment, the embedded additional user interface 10 is designed to interface with the hardware configuration of game platforms currently employed in an existing gaming communication systems network, thus decreasing implementation costs for the casino. A standard gaming network interface to the systems network, such as a Mastercom system, includes a multi-drop bus method of communicating to a keypad and display. The Mastercom system is available from Bally Manufacturing, and is described in U.S. Pat. No. 5,429,361 to Raven et al., incorporated herein by reference. One such currently utilized bus is an EPI bus (Enhanced Player Interface bus), which uses industry standard $I^2C$ hardware and signaling.

In one preferred embodiment, the embedded additional user interface 10 is used to replace/upgrade an EPI bus. Preferably, the embedded additional user interface 10 replaces the EPI bus in the gaming machine in a "plug and play" manner. In other words, the old EPI bus can be unplugged and the new embedded additional user interface 10 can simply be plugged into the $I^2C$ bus of the gaming machine 40, where the user interface 10 utilizes the currently employed industry standard $I^2C$ hardware and signaling without requiring any further modification. The embedded processor 30 of the embedded additional user interface 10 reads incoming $I^2C$ data (content), translates the data into a web authoring language (e.g., HTML, DHTML, XML, MACROMEDIA FLASH), and maps the data to the web page display screen 20. In this manner, the previous $I^2C$ data messages, which were typically presented on a 2-line, 20 character VF display, are automatically transformed by the embedded additional user interface 10 into an attention grabbing, animated (multimedia) web page style format. This results in enhanced player satisfaction and excitement with extremely minimal retrofitting requirements.

Since, in one preferred embodiment, the embedded additional user interface 10 utilizes $I^2C$ hardware and signaling, this enables the user interface 10 to speak and understand the $I^2C$ protocol message set, and thus, communicate directly with the gaming processor 60 of the gaming machine 40 (or other networked devices) in the same fashion in which the gaming processor previously communicated with the EPI bus. Accordingly, in a preferred embodiment of the claimed invention, the functionality of the previously utilized hardware (e.g., the EPI bus) is replaced and substantially upgraded with the integration of the embedded additional user interface 10 into the gaming machine 40. As such, the external hardware of any such system components (e.g., a keypad and a 2-line, 20 character VF display) is eliminated.

As stated above, in one preferred embodiment, the incoming data received by the embedded additional user interface 10 is $I^2C$ signaling protocol; however, in other preferred embodiments other serial communication protocols (or electronic communication format) are utilized. Preferably, the embedded processor 30 communicates with the gaming processor 60, and/or other connected devices, over an $I^2C$ bus (or over another serial communications bus in embodiments that utilize another protocol). The web page display screen 20 of the embedded additional user interface 10 is preferably a color-graphic touch screen display. Preferably, the embedded processor 30 is at least a 32-bit processor. A preferred embodiment utilizes a 32-bit processor because cryptographic techniques, such as SHA-1 and DSA algorithms, are written and operate natively on a 32-bit system. Additionally, the Microsoft® Windows® environment, which is utilized in some preferred embodiments of the claimed invention, is also 32-bit. Further, the internal operating system of the embedded additional user interface 10 is preferably customized to match the specific hardware to which the internal operating system attaches.

Preferably, the embedded additional user interface 10 is an embedded computer board that, in addition to the embedded processor 30 and the web page display screen 20, further includes a removable card 75 (or other memory storage device), as shown in FIG. 1, and a network adapter port. Content and feature updates to the embedded additional user interface 10 are accomplished by physically swapping out the card 75 (or other memory storage device). Thus, in order to retrieve data from the embedded additional user interface 10, the data is accessed by physically removing and reading the card 75.

In one preferred embodiment, the internal operating system utilized by the embedded processor 30 of the embedded additional user interface 10 is WINDOWS® CE version 4.2 (or higher). Preferably, the embedded additional user interface 10 is built upon a PXA255-based board developed by the Kontron Corporation. Additionally, in a preferred embodiment of the embedded additional user interface 10, the browser control for the web page display screen 20 is MICROSOFT® INTERNET EXPLORER® 6.0 (or higher), which is shipped standard with WINDOWS® CE 4.2, the preferred internal operating system for the embedded processor 30.

A preferred embodiment of the embedded additional user interface 10 also provides a mechanism for inputting system information into, and retrieving system information from, the game machine 40. As stated above, the embedded additional user interface 10 preferably uses industry standard $I^2C$ hardware and signaling. The $I^2C$ protocol has multi-master capabilities, i.e., is capable of participating both as a slave and as a master. The embedded additional user interface 10 enables system information (such as information input by a player into a web page display screen 20) to be sent from the game machine 40 to a slot system network (or to another destination location). Likewise, the embedded additional user interface 10 also enables the system information (such as display messages) to be sent from the systems network (or from another source location) to the game machine 40 for viewing by the player through the web page display screen 20.

In a preferred embodiment, information can also be input by a user into the web page display screen 20 of the user interface 10. The web page display screen 20 of the user interface 10 employs a virtual keypad. Further, the user interface 10 uses a keypad dictionary that allows a user to be able to enter a vastly greater amount of information than was previously possible using a 12 digit VF keypad. For example, the virtual key on the touch screen that is displayed by the browser is pressed by a user. This calls the Keypad object by calling its Dispatch interface with a string that identifies which virtual key was pressed. The Keypad object looks up the string in the Dictionary object which has been loaded at initialization time with a set of keys to return when that string is passed to it. When it retrieves this set of zero or more key characters, it passes them to the GMU by calling the interface exposed by the object.

Typically, a network interface (or equivalent system) is used to control the flow of funds used with the gaming machine 40 within a particular casino. By utilizing the embedded additional user interface 10 of the claimed invention, the gaming network interface can be instructed to move funds between player's accounts and gaming devices by merely touching the web page display screen 20. In addition, many other more sophisticated commands and instructions may be provided. Thus, the embedded additional user interface 10 improves the player and casino employee interface to the gaming machine 40, directly at the gaming device itself.

In a preferred embodiment of the claimed invention, the web page display screen 20 of the embedded additional user interface 10 enables a player to be shown player messages in an animated, multimedia, web content style environment. These messages would previously have been displayed in a significantly more mundane format on a separate display device (e.g., a 2-line VF display device). In some preferred embodiments, touch screen buttons in the web page display screen 20 are used by the player to navigate between windows in web page display screen 20 and allow access to system functions such as cashless withdraw, balance requests, system requests, points redemption, and the like. In other preferred embodiments of the claimed invention, the web page display screen 20 utilizes various other data input techniques commonly known in the art, instead of the touch screen data entry. Thus, implementation of the embedded additional user interface 10 is an efficient, highly beneficial, and substantial upgrade to a gaming machine 40 that greatly increases the functionality over what was previously possible using an EPI bus.

In one preferred embodiment, text data messages are translated into web page navigation requests by the embedded processor 30 and then displayed on the web page display screen 20. Script languages, such as JAVA SCRIPT and VB SCRIPT, are also utilized for some of the web pages. Preferably, the embedded additional user interface 10 emulates the 12-digit keypad and the 2×20 VF display on the web page display screen 20, which has touch screen capabilities. In this embodiment, commands that were previously displayed on the 2×20 VF display are matched to a corresponding URL and a browser is used to render the page on the web page display screen 20. The web pages displayed contain touch-screen keys that effectively emulate hardware keys.

In one preferred embodiment of the claimed invention, a dictionary URL approach is used for translating the data messages into web page information. In this manner, data messages are "looked up" in a dictionary data file where they can be redirected to an attractive URL. The embedded processor 30 responds to requests on the $I^2C$ bus that were intended for the prior art enhanced player interface (EPI) VF display. The web page display screen 20 is not a passive display device like traditional PC monitors, but rather the display screen 20 must respond to commands with text type responses. These requests include initialization requests, status requests, and display requests. As each text data message to be displayed is passed into the embedded processor 30, the processor 30 calls a URL Dictionary to look up a URL with which to replace the text data message. Once the substitution is complete, the embedded processor 30 instructs the web page display screen 20 to present (or navigate to) the appropriate web page.

Accordingly, a URL Dictionary component is used to map a text string, sent from the embedded processor 30 and intended for the display on the 2×20 VF display, to a URL that can be used to display a much more visually enhanced graphical representation of the same message. Thus, the URL Dictionary component contains a listing of the possible text messages to be supported that could be sent from the embedded processor 30, and a mapping to a set of the desired eye-catching, web content to be displayed on the web page display screen 20. In the event that a message is not in the URL Dictionary, such a message is mapping to a page that substitutes for the 2-line mode.

In the preferred embodiments described above, the embedded processor 30 of the embedded additional user interface 10 reads incoming $I^2C$ data messages, translates the $I^2C$ data messages into a web authoring language (e.g., HTML, DHTML, XML, MACROMEDIA FLASH), and maps the newly translated web page data message to the web page display screen 20. Additionally, the embedded additional user interface 10 can also read incoming data messages that are already in a web authoring language (e.g., HTML, DHTML, XML, MACROMEDIA FLASH) and map this web page data to the web page display screen 20. Further, and highly advantageously, a preferred embodiment of the claimed invention also allows casinos that are using the embedded additional user interface 10 to design and use their own content, thereby giving the casinos the ability to decide what the web page presented on the web page display screen 20 of the user interface 10 will look like.

Figure 3:
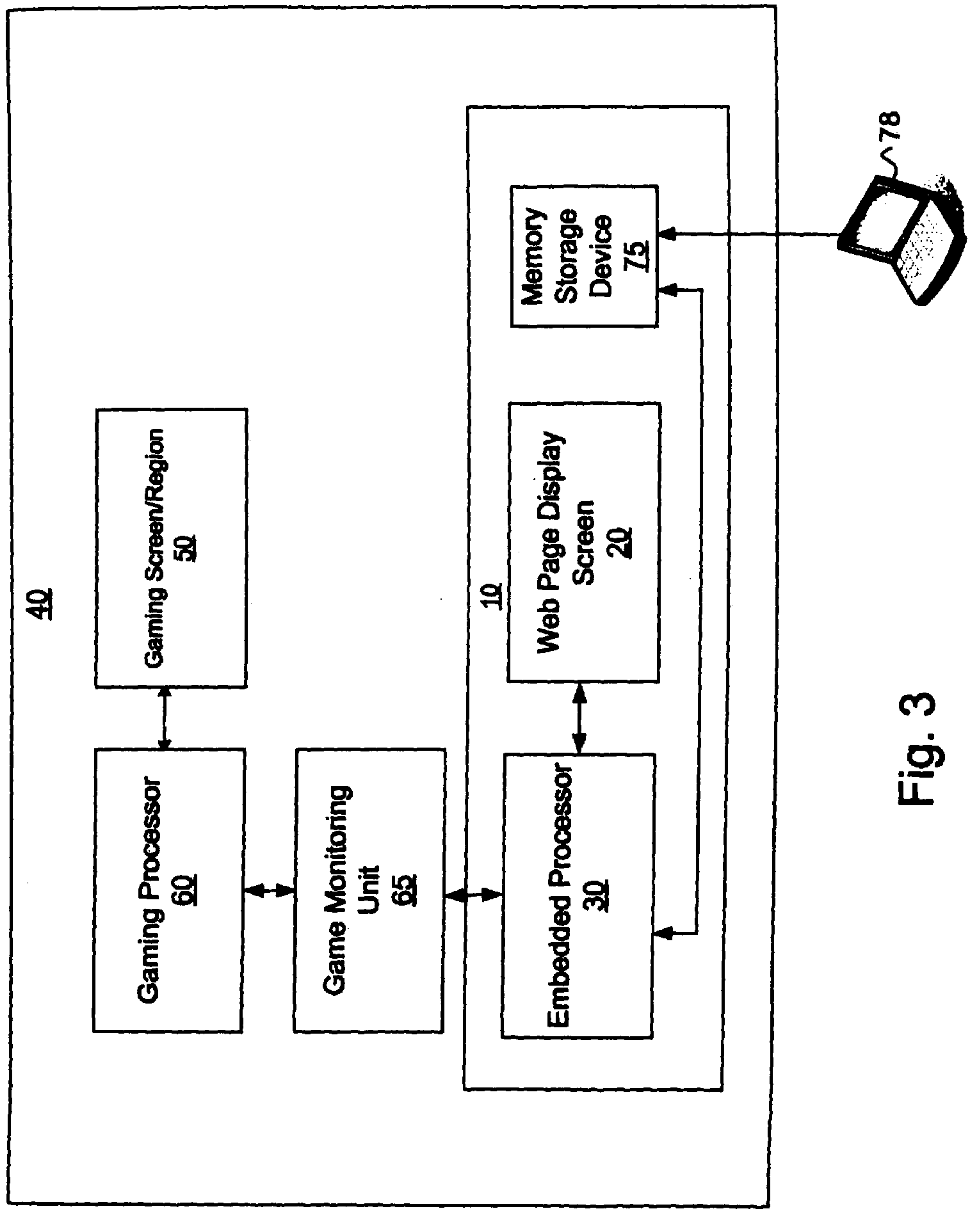
FIG. 3 illustrates a relational diagram of an embedded additional user interface, constructed in accordance with the claimed invention, utilizing a web page display screen and an embedded processor that receives cryptographically certified web page content from a portable computer via a network adapter port.

Referring now to FIG. 3, in this preferred embodiment, the content may be locally downloaded. Specifically, in one preferred embodiment, the content is updated through a physical USB (or other connection) that is used to download the new content. In one preferred embodiment, the data on the card 75 can be accessed by connecting a separate computer to the network adapter port of the embedded additional user interface 10. This embodiment allows updating the contents of the operating system, changing the operating system itself, and receiving data from the card 75. Physical removal of the card 75 is also still an option for update and inspection of files on the embedded additional user interface 10.

In one preferred embodiment, a portable computer is used to store and to publish data content to the card 75 on the embedded additional user interface 10, as well as to receiving data from the card 75 on the embedded additional user interface. In this embodiment, all content on the embedded additional user interface 10 is authenticated as if it were a gaming machine.

In another preferred embodiment, a network adapter port is run on the embedded computer board of the user interface 10. This embodiment also includes a boot loader. Further, in this embodiment, the portable computer (described above) includes components for use in uploading data to, and downloading data from, the card 75 on the embedded additional user interface 10. Specifically, the components that run on the portable computer 78 are for moving new data content to the embedded additional user interface 10, and for validation and verification of the data content that is on the embedded additional user interface. Preferably, all data that is used to update the card 75 moves to or from the embedded additional user interface 10 over the single built in network adapter port on the board.

Prior to the advent of the embedded additional user interface 10 of the claimed invention, gaming regulators would have been unwilling to allow casino operators to design their own content. However, due to the cryptographic technology implemented by the embedded processor 30 in the embedded additional user interface 10, a certification process is provided by the claimed invention with sufficient security for gaming regulators to allow casino operators to design their own content. Specifically, in one preferred embodiment, the certification process offered ensures authentication and non-repudiation of the casino operator designed web content.

Preferably, in the claimed invention the certification process provided further ensures auditability and traceability. Various cryptographic technologies, such as authentication and non-repudiation (described herein below), are utilized in preferred embodiments of the claimed invention to provide sufficient security for gaming regulators to allow casino operators to design their own content.

In one preferred embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one preferred embodiment, a "new tier" or second PKI is created that is rooted in the primary PKI and that leverages the capabilities of the certificate (e.g., a x509 certificate) that allow for limited access. Thus, this preferred embodiment allows the attributes within the certificate are used to provide "levels" of code access and acceptance in the gaming industry.

In one preferred embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another preferred embodiment, the content is protected using other suitable technology.

In one preferred embodiment, a Secure Hash Function-1 (SHA-1) is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number.

In another preferred embodiment, the claimed invention utilizes a Message Authentication Code (MAC). A Message Authentication Code is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A Message Authentication Code is attached to data in order to allow data authentication. Further, a MAC may be used to simultaneously verify both the data integrity and the authenticity of a message. Typically, a Message Authentication Code (MAC) is a one-way hash function that takes as input both a symmetric key and some data. A symmetric-key algorithm is an algorithm for cryptography that uses the same cryptographic key to encrypt and decrypt the message.

A Message Authentication Code can be generated faster than using digital signature verification technology; however, a Message Authentication Code is not as robust as digital signature verification technology. Thus, when speed of processing is critical the use of a Message Authentication Code provides an advantage, because it can be created and stored more rapidly than digital signature verification technology.

In one preferred embodiment, the authentication technique utilized is a bKey (electronic key) device. A bKey is an electronic identifier that is tied to a particular individual. In this manner, any adding, accessing, or modification of content that is made using a bKey for authentication is linked to the specific individual to which that bKey is associated. Accordingly, an audit trail is thereby established for regulators and/or other entities that require this kind of data or system authentication.

Another preferred embodiment of the verification system utilizes "component bindings" for verification using cryptographic security. In component binding, some components come equipped with unalterable serial numbers. Additionally, components such as web content or the game cabinet may also be given another random identification number by the owner. Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such preferred embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1) using the key derived from the bindings. This signature is verified whenever an entry is made to a component within the binding. If the signature is wrong, this security violation and the violator are noted, but typically the entry is not prohibited. In other preferred embodiments, the entry may be prohibited as well. Thus, the component binding produces a cryptographic audit trail of the individuals making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation, the cabinet, motherboard, specific software, non-volatile RAM card, content (data), and hard drive. These identification numbers combined in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the individual making the change. In one preferred embodiment, a specific level of bKey clearance or classification is required to make specific changes.

Figure 6A:
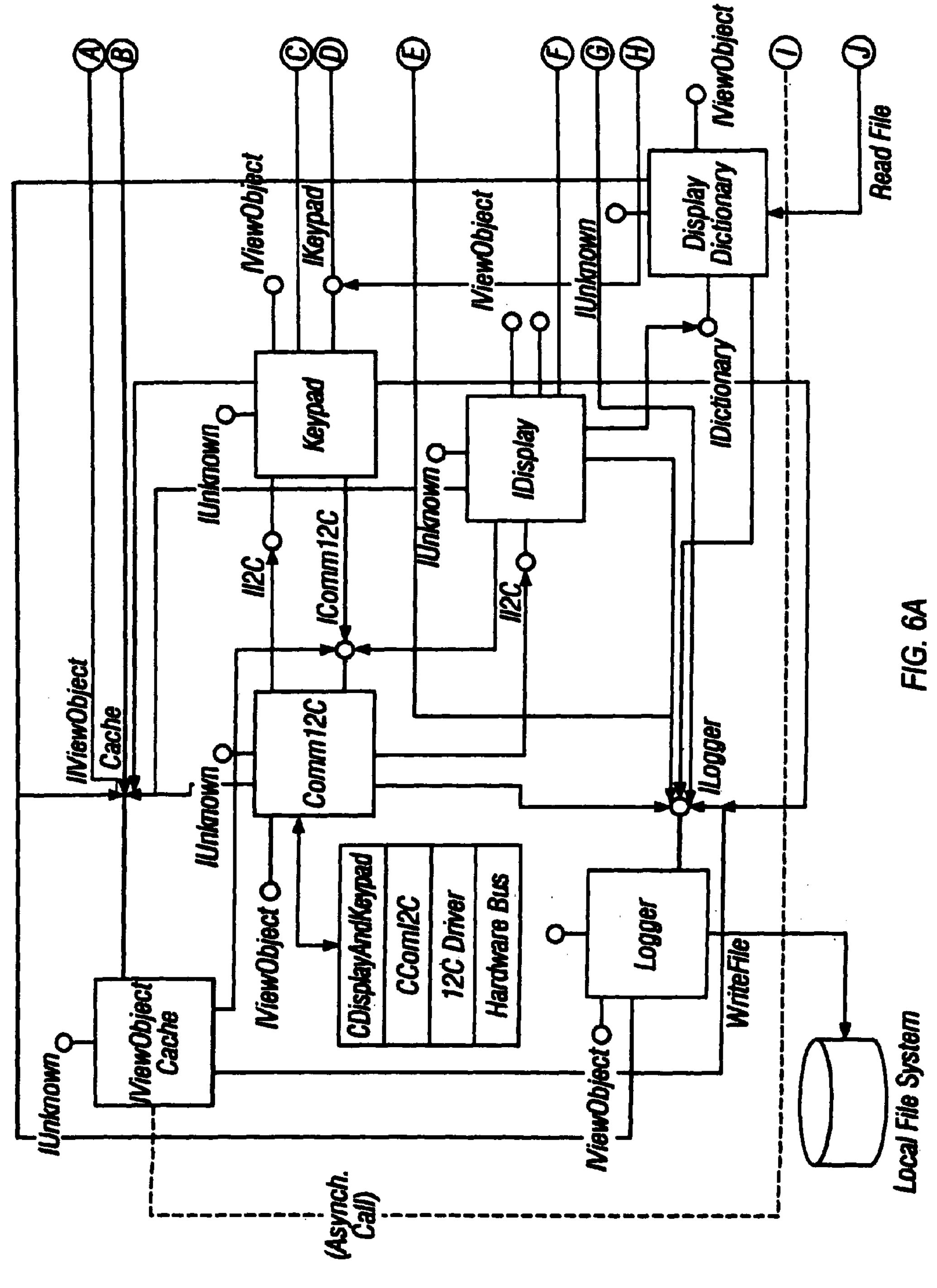
FIG. 6 illustrates an object interaction diagram of an embedded additional user interface, constructed in accordance with the claimed invention.
Figure 6B:
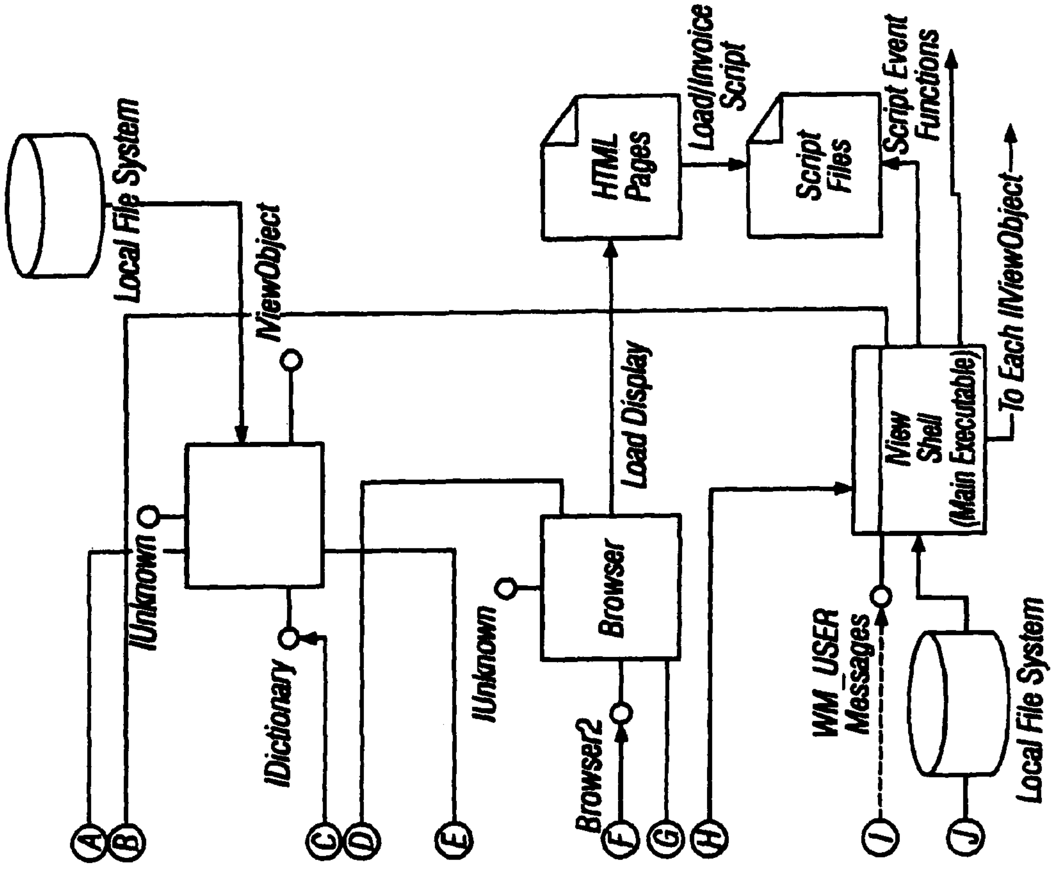
Figure 7:
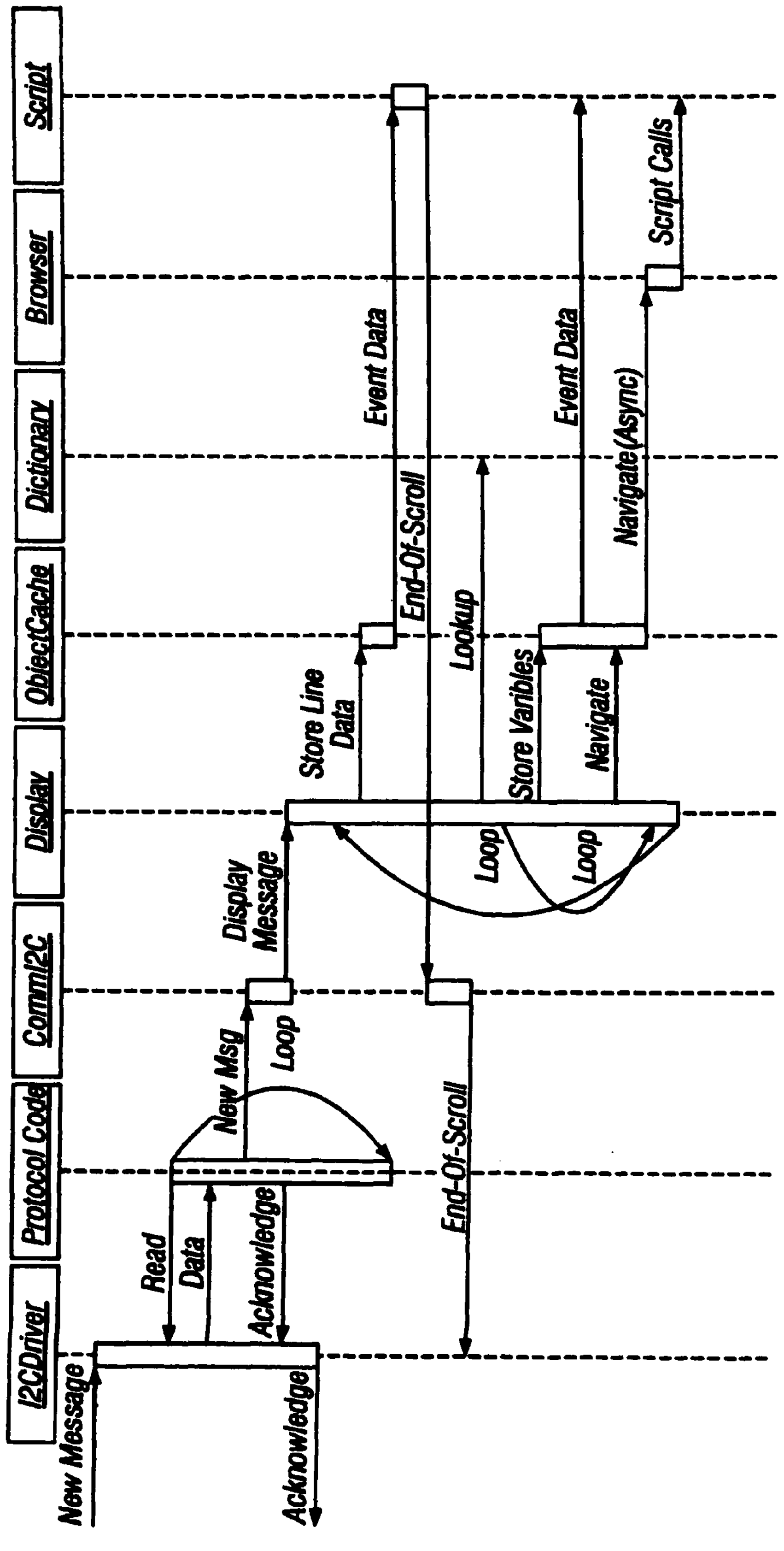
FIG. 7 is a diagram showing the sequence of events that occur when data is sent between the embedded additional user interface and the game monitoring unit.
Figure 8:
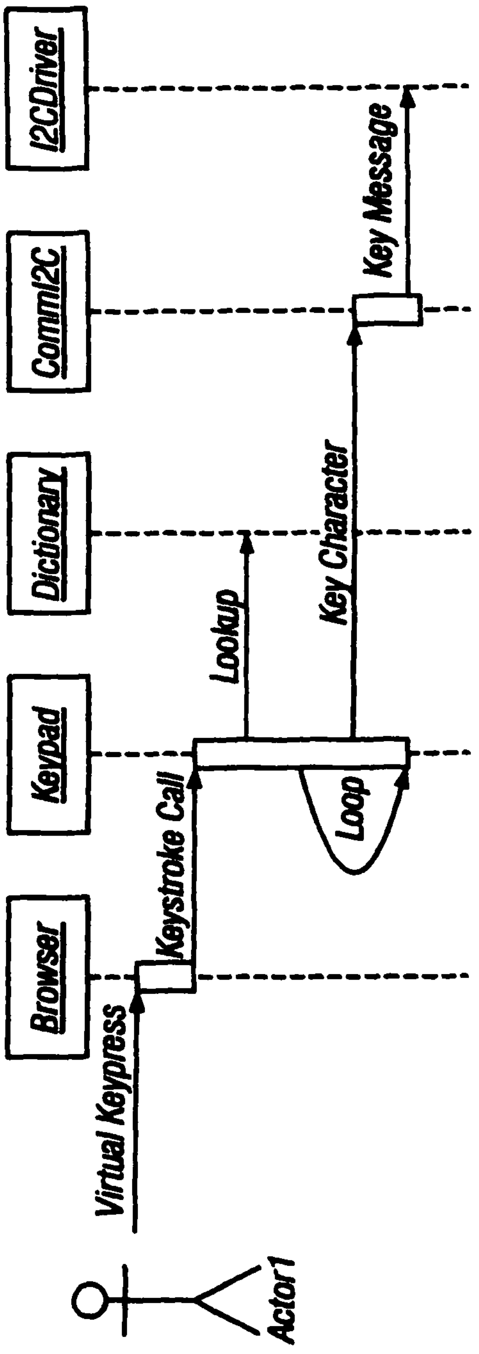
FIG. 8 is a diagram showing the sequence of events that occur when a virtual key is pressed on the web page display screen.

In one preferred embodiment, text data messages are translated into web page navigation requests by the embedded processor 30 and then displayed on the web page display screen 20 as shown and discussed with respect to FIGS. 6A and 6B below. Script languages, such as JAVA SCRIPT and VB SCRIPT, are also utilized for some of the web pages. Preferably, the embedded additional user interface 10 emulates the 12-digit keypad and the 2×20 VF display on the web page display screen 20, which has touch screen capabilities. In this preferred embodiment, commands that were previously displayed on the 2×20 VF display are matched to a corresponding URL and a browser is used to render the page on the web page display screen 20. The web pages displayed contain touch-screen keys that effectively emulate hardware keys. With reference to FIGS. 6A and 6B, in one preferred embodiment of the claimed invention, a dictionary URL approach is used for translating the data messages into web page information. In this manner, data messages are "looked up" in a dictionary data file where they can be redirected to an attractive URL. The embedded processor 30 responds to requests on the I2C bus that were intended for the prior art enhanced player interface (EPI) VF display. The web page display screen 20 is not a passive display device like traditional PC monitors, but rather the display screen 20 must respond to commands with text type responses. These requests include initialization requests, status requests, and display requests. With reference to FIGS. 7, as each text data message to be displayed is passed into the embedded processor 30, the processor 30 calls a URL Dictionary to look up a URL with which to replace the text data message. Once the substitution is complete, the embedded processor 30 instructs the web page display screen 20 to present (or navigate to) the appropriate web page. Accordingly, with reference to FIG. 8, a URL Dictionary component is used to map a text string, sent from the embedded processor 30 and intended for the display on the 2×20 VF display, to a URL that can be used to display a much more visually enhanced graphical representation of the same message. Thus, the URL Dictionary component contains a listing of the possible text messages to be supported that could be sent from the embedded processor 30, and a mapping to a set of the desired eye-catching, web content to be displayed on the web page display screen 20. In the event that a message is not in the URL Dictionary, such a message is mapping to a page that substitutes for the 2-line mode.

Figure 4:
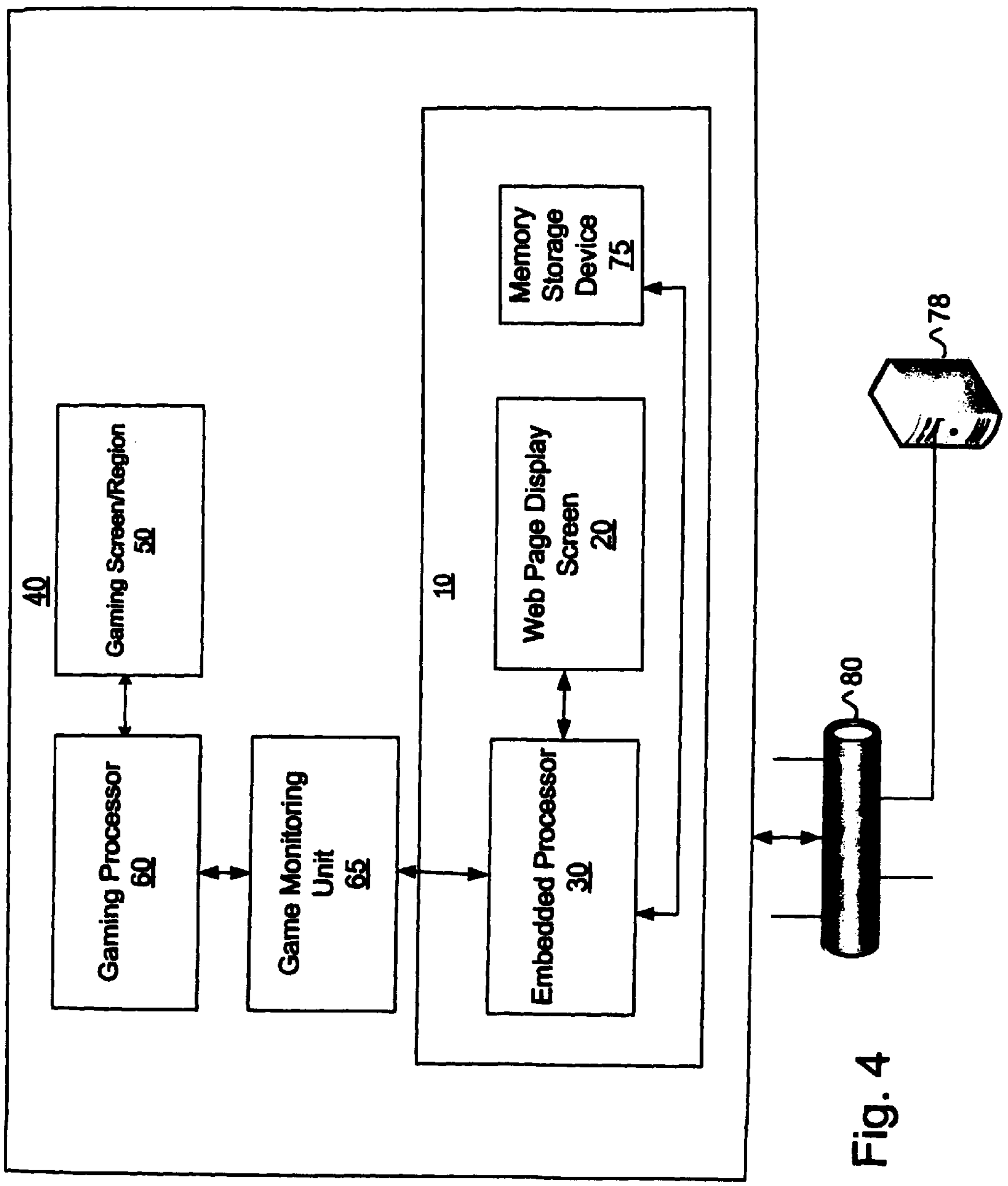
FIG. 4 illustrates a relational diagram of an embedded additional user interface, constructed in accordance with the claimed invention, utilizing a web page display screen and an embedded processor that receives web page content from a back-end server via an Ethernet-networked backbone.

Referring now to FIG. 4, in one preferred embodiment, the embedded additional user interface 10 connects to an Ethernet-networked backbone 80 instead of a local system network. Currently, casino networks are not Ethernet, but rather are smaller, more simplistic local system networks. Thus, in this Ethernet-networked backbone 80 embodiment, the current system network is replaced by an industry standard Ethernet backbone, such as 10/100 base T Ethernet running over Cat 3, 4, 5, 6, or higher. Thus, a standard 10/100 base T Ethernet card is added to the processor in this embodiment. Preferably, the network employs TCP/IP, HTTP, and XML messaging or a variant of XML. Nevertheless, any suitable protocol may be used.

Further, in another preferred embodiment, the embedded additional user interface 10 connects to a full featured, back end, download configuration server 90 through the above-described Ethernet-networked backbone 80 as shown in FIG. 4. In such an embodiment, the full-featured server 90 can schedule downloads of content (gaming or otherwise) as well as upload information from the gaming machines 40, such as what options the gaming machines 40 currently possess. Accordingly, in a preferred embodiment, the primary use of the server 90 is a data download and data retrieval server. While this server 90 does upload and download web content style information, it is typically not connected to the World Wide Web. This server 90 must be authenticated (just like a gaming machine) to make the content served to the embedded additional user interface 10 acceptable to the gaming regulators. Preferably, utilization of the Ethernet-networked backbone 80 and the server 90 provides many system benefits, including but not limited to reliability, maintainability, security, content staging, content testing, deployment procedures, and incident recovery. In one embodiment, deliverables also preferably include content templates and guidelines for casino owners and operators to create their own web content for deployment to the web server. In one embodiment, the web server 90 has its content authenticated in the same manner as the embedded additional user interface 10 to allow content to be downloaded to the web page display screen 20.

Figure 5:
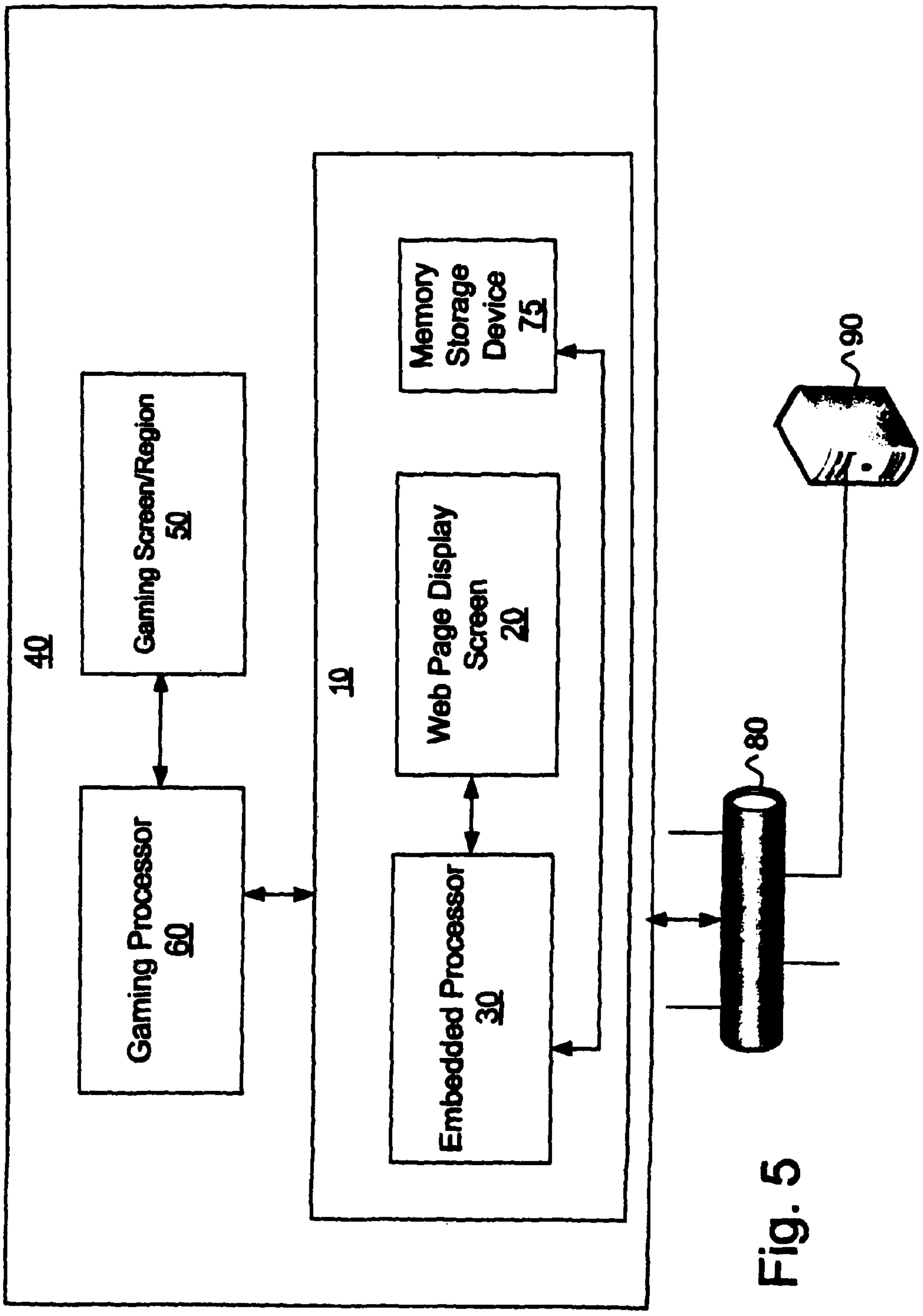
FIG. 5 illustrates a relational diagram of an embedded additional user interface, constructed in accordance with the claimed invention, utilizing a web page display screen and an embedded processor that includes the functionality of a standard gaming processor.

Referring now to FIG. 5, in another preferred embodiment of the claimed invention, the functions previously performed by the gaming monitoring unit 65, as shown in FIGS. 1-4, of the gaming machine 40 are supported by the embedded processor 30 of the embedded additional user interface 10. Otherwise stated, the GMU code is transitioned from the gaming monitoring unit 65 into the embedded processor 30 in the embedded additional user interface 10. Accordingly, such a configuration removes the need for the gaming monitoring unit 65 in the gaming machine 40. This results in a significant reduction in the amount and complexity of the hardware, as well as completing a phased transition of more traditional style gaming machines into more modernized upgraded gaming machines.

Thus, in such a preferred embodiment, the claimed invention is directed towards an embedded additional user interface 10 that is incorporated into a gaming machine 30, the gaming machine in turn including a gaming screen 50 or other appropriate gaming region (e.g., spinning reels), but does not include a gaming monitoring unit 65. Such an embedded additional user interface 10 still includes a web content-capable display screen 20 and an embedded processor 30. Once again, the web content-capable display screen 20 presents web information to a user via the display screen. The embedded processor 30 preferably utilizes an internal operating system. Furthermore, in this embodiment the embedded processor 30 additionally includes standard game monitoring unit functionality (GMU code), since it replaces the gaming monitoring unit 65 in the gaming machine 40. As before, the embedded processor 30 reads incoming data, translates the data into a web protocol (web authoring language), if necessary, and maps the data to the web content-capable display screen 20.

In one embodiment, the embedded additional user interface 10, the messages are flashed (e.g., animation, multimedia, and the like) to the player within the web page display screen 20 while the gaming screen 50 is used for game play. These web page style messages can be set at virtually any desired length, format, or style. A message might display, for example, "Welcome to Harrah's Las Vegas! You have 1200 bonus points. Would you like to make a hotel or dinner reservation?" Importantly, while a previous utilized EPI bus would only been capable of scrolling this message in one-quarter inch (0.25") tall monochrome text, in contrast, the web page display screen 20 would "flash" this message in bright red, white, black, and green animated format, on six inch (6.0") by three inch (3.0") color graphic display. Additionally, in some embodiments, inserting a player identification card into a card reader and/or selecting a player services button activates additional player services functionality.

In one exemplary embodiment of the embedded additional user interface 10 that utilizes a card reader (or other identification technique, such as a player ID code) to recognize a particular player, the web page display screen 20 displays an eye-catching, web page style message to that player, for example, "Welcome, Mr. Smith!" in response to identifying Mr. Smith. Preferably, the web page display screen 20 also has touch screen capabilities that include, by way of example only, and not by way of limitation, "Beverages," "Change," "Services," "Transactions," and "Return to Game." In one embodiment, each of the touch screen icon buttons, when selected, launches a new full screen display within the web page display screen 20 for the player.

For example, in one embodiment, when the "Transactions" touch screen icon button is selected, a new screen is activated that includes the web page style message, "Mr. Smith, Account Balance: Bonus Points=1200, Player Funds=$150, Available Credit=$850, Casino Matching Funds Available=$25," as well as the "Return to Game" icon button 120. As a further example, when the player selects a "Cashless Withdraw" button in another embodiment, a new screen is activated that includes a touch screen keypad and flashes the question, "How much do you want?" as well as "Enter," "Clear," and "Back" buttons. Preferably, this interface also includes an "Information" button that, when selected, launches a new screen within the web page display screen 20 that provides answers to frequently asked questions and other useful information. Moreover, the web page display screen 20 preferably also includes a "History" button that, when selected, launches a new screen within the web page display screen 20 that provides a history log of all transactions and other actions performed on that gaming machine 40.

In accordance with another preferred embodiment, the claimed invention is directed towards a method for increasing user excitement relating to a gaming machine by providing a richer gaming experience via an embedded additional user interface that is incorporated into the gaming machine. The method preferably includes: receiving a serial data message (e.g., an $I^2C$ data message) containing enhanced player information over a serial communication bus (e.g., an $I^2C$) bus in the embedded additional user interface 10; translating the data message (using the embedded processor 30) into a web authoring language; and mapping the data message to the web page display screen 20, wherein the display screen presents web page information to a user via the display screen.

The potential advantages of utilizing the embedded additional user interface 10 of the claimed invention are numerous. These potential advantages include, by way of example only, and not by way of limitation; providing animated and/or multimedia web style content, providing fonts and icons which are larger and more aesthetically appealing; providing special services to players, (e.g., multiple languages, assistance for handicapped individuals); facilitating interactive uses of the web page display screen 20; providing the ability to customize the "look and feel" of the web page display screen 20 for players and casino employees; increased player excitement and participation; and simplified replaceability and/or upgradeability from an EPI bus or other similar non-web page style components.

Figure 9:
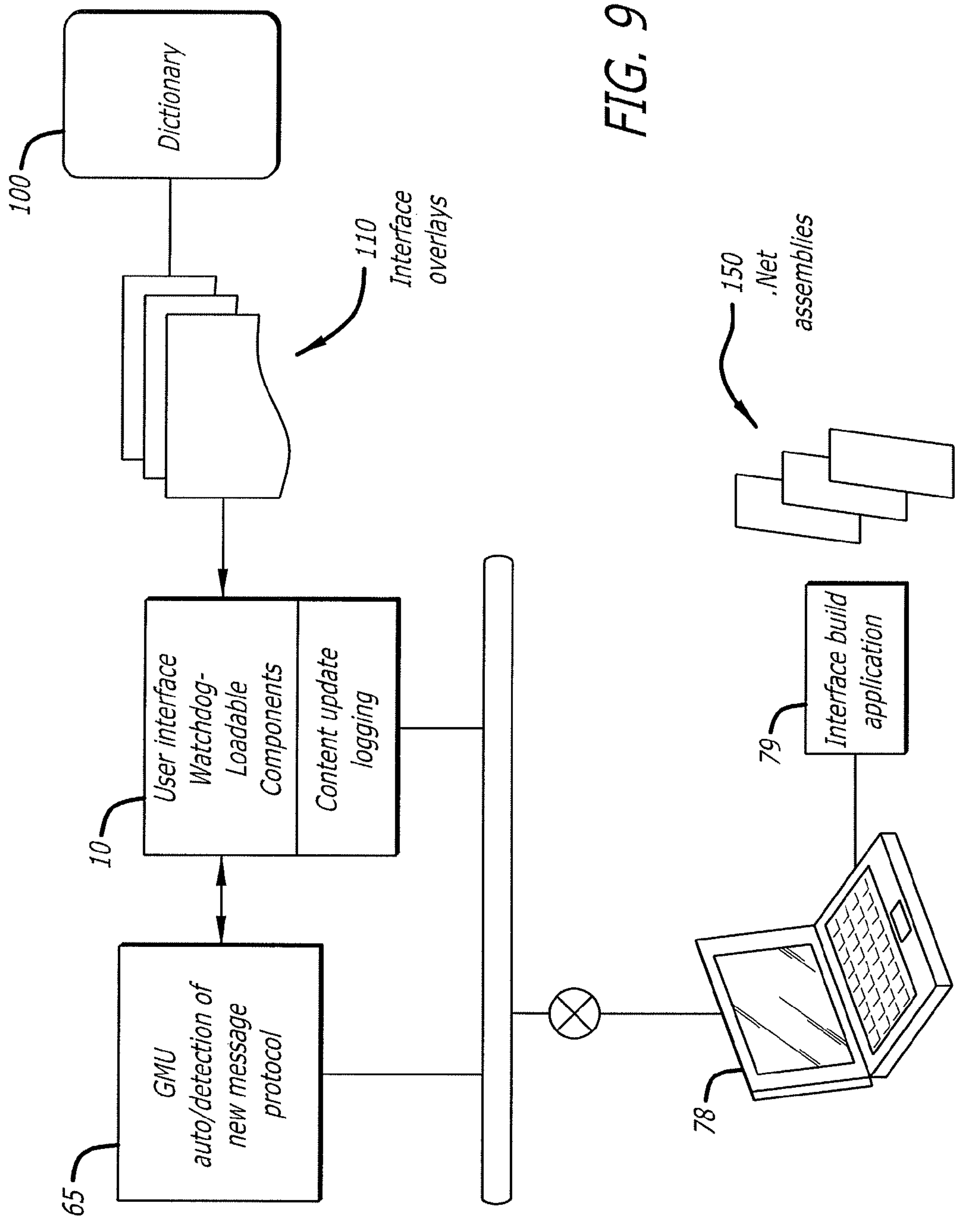
FIG. 9 is a high level system diagram of a portable computer and the build application with the embedded additional user interface.

As described above in reference to FIG. 3, in one preferred embodiment of the embedded additional user interface 10, a certification process is provided with sufficient security for gaming regulators to allow casino operators to design their own content. Additionally, as shown in FIG. 9, in one preferred embodiment the embedded additional user interface 10 includes an interface build application 79 that enables casino operators (or other authorized third parties) to create original content and/or to modify existing content relating to the "look and feel" of the gaming environment. A specific instance of such new or modified content is referred to herein as an interface overlay 110.

In a preferred embodiment, the interface build application 79 enables casino operators (or other authorized third parties) to update content on a gaming systems display, as well as to select user interfaces which they have determined are the easiest for the slot machine players to use. Additionally, the interface build application 79 of the embedded additional user interface 10 provides casinos with a capability to select which marketing messages are shown to individual slot machine players, as well as providing casinos with player tracking capabilities. In this manner, the user interface build application facilitates integrating custom content into the embedded additional user interface 10.

In one preferred embodiment, the interface build application 79 does not create a full end product. Instead the interface build application 79 creates a design and specification blueprint for final deployment. In another preferred embodiment, the interface build application 79 creates exportable content without third party assistance, including the auto-creation of dictionary files for a casino's proprietary messages. In still another preferred embodiment, the interface build application 79 creates exportable content from a central server. In a different preferred embodiment, a user updates the content of the interface build application 79 itself.

In another aspect of a preferred embodiment, the interface build application 79 of the embedded additional user interface 10 enables a user to reconfigure the "look and feel" (e.g., interface overlay 110) of the embedded additional user interface. Specifically, such users employ the interface build application 79 to customize a set of interface overlays 110 (e.g., templates, graphical overlays, or the like). The functionality that can be modified or added using the interface build application 79 includes, by way of example only, and not by way of limitation: adding logos, artwork, and text; rearrange screens; changing buttons, button colors, and button locations; and enabling and disabling features.

In one preferred embodiment, the embedded additional user interface 10 is part of a local network. Preferably, a network server is part of the local network. In a preferred embodiment, the interface build application 79 is formed on the network server. In a preferred embodiment, the server signs content, certify the content, and send the content to the embedded additional user interface 10. In one preferred embodiment, a user logs onto a website where the interface build application 79 is formed on a website. The user builds a new graphics interface overlay 110 for an embedded additional user interface 10, views this graphics interface overlay, and initiates the verification, logging, and downloading of the graphics interface overlay to the embedded additional user interface 10 over the internet (or communication line in a local, non-internet embodiment).

Operating the interface build application 79 with network connectivity reduces casino hardware and maintenance costs associated with updating the embedded additional user interface content. The interface build application 79 includes enhanced content tools that reduce the time required to deploy content for an embedded additional user interface 10 to a new casino, and that reduce the time for a casino to upgrade the content for an embedded additional user interface 10. The interface build application 79, by utilizing digital signing of content and applications, provides greater security and allows additional jurisdictions to deploy the embedded additional user interface 10 and the associated interface build application 79.

In one aspect of one preferred embodiment, the interface build application 79 (FIG. 9) resides on a portable computer 78 (FIG. 9). The main areas within the application are content creation, configuration creation, and digital signature creation for both new content and new configurations. Once new content has been created or a new configuration chosen, either random or non-random identification numbers are generated for each grouping of new content and for each new configuration (e.g., graphics interface overlay 110), or in another aspect of a preferred embodiment, for each grouping of new sub-content and for each new sub-configuration. From these, binding codes, as explained above, are generated, along with some combination of digital signatures or message authentication codes. In one preferred embodiment, the digital signatures, as above, are determined from a Digital Signature Algorithm (DSA). In another preferred embodiment, the digital signatures are determined from a Rivest-Shamir-Adleman (RSA) algorithm. The overall certification lies within the Public Key Infrastructure, which includes a public-private key pair.

As depicted in FIG. 9, in one preferred embodiment the embedded additional user interface 10 interconnects with the portable computer 78 (or other portable computing device) and the build application 79. The interface build application 79, shown in FIG. 9 on the portable computer 78, is intermittently connected to the embedded additional user interface 10, which in turn communicates with the GMU 65. In other preferred embodiments, the GMU 65 functions may be incorporated into the embedded additional user interface 10.

In one preferred embodiment, the interface build application 79 is employed to create or modify content for embedded additional user interface 10 with the assistance of a portable computer 78. In such an embodiment, instructions are sent from the interface build application 79 by way of the portable computer 78 to the embedded additional user interface 10, thereby enabling the user interface to accept only certain dictionary files 100 which are part of the interface build application's current interface overlay 110. In an aspect of one preferred embodiment, this current interface overlay 110 is what the casino or user has settled on and chosen for its various display screens on the embedded user additional interface 10. One preferred embodiment of an interface build application in shown in FIGS. 10-17.

At boot time, dictionary files 100, which have been selected for the current interface overlay 110, are loaded to the user interface 10. Preferably, this process is auto-detected by the GMU 65 (or its equivalent function in an embedded additional user interface) as a certified, signed application and content, as determined by the security gate-keeping application of the user interface 10. With respect to one aspect of a preferred embodiment, a particular programming methodology referred to as .Net utilized. The .Net based application supports loadable assemblies. Net assemblies 150, in the preferred embodiment shown, are used to build the interface build application 79. Each loadable assembly 150 supports a major area, such as content creation.

Referring back momentarily to FIG. 3, in a preferred embodiment, content may be locally downloaded. The data on the COMPACT FLASH card 75 can be accessed by connecting a portable computer 78 to the network adapter port of the embedded additional user interface 10. In this preferred embodiment, all content on the embedded additional user interface 10 is authenticated as if it were a gaming machine. Due to the cryptographic technology implemented by the embedded processor 30 in the embedded additional user interface 10, a certification process is provided by the claimed invention with sufficient security for gaming regulators to allow casino operators to design their own content. In one preferred environment, a DSA digital signature for new content or configuration of content into an interface overlay 110 results from the encryption of a random number using three public parameters and a private key. Verification is obtained by a type of decryption of the encrypted random number and checking that a function of the "decrypted" random number matches one of the public parameters.

In one preferred embodiment, the web page display screen 20 is alterable using an interface build application 79. The results of this interface build application 79 (i.e., interface overlays 110) are downloadable from a portable computer 78 to an embedded additional user interface 10. The embedded additional user interface 10 contains a computer readable storage medium 75, which in a preferred embodiment, is a COMPACT FLASH card 75. Alternatively, a server 90, linked by a network, may replace the functionality of the portable computer.

In one preferred embodiment, the application displays a main navigation screen area (on the web page display screen 20), which is on the left side of the portable computer's display screen. Preferably, the main interface overlay build is displayed at the top of the display screen 20. As the user of the interface build application 79 makes selections, these selections are displayed in the top area of the display screen 20. Preferably, the application flow is linear and sequential. In one preferred embodiment, all buttons are deactivated until the user reaches each section in the order it is presented. Preferably, once a section has been completed, a user is able to backtrack and modify past selections.

In one preferred embodiment, the configuration results of the interface build application 79 are not directly applied to the embedded additional user interface 10. Instead the interface build application 79 generates information that instructs a user how to build new interface overlays 110 for the "look and feel" desired by a casino or user. In one preferred embodiment, this information, which is a design configuration requirement, is sent to a third party. The third party processes this design configuration requirement into an operable version of the new interface overlays 110. This finished, operable product is returned to the casino (or user) for downloading through the embedded additional user interface 10 to the computer readable storage medium 78.

In another preferred embodiment, the interface build application 79 sends results directly to a server 90. This server 90 digitally signs the content, certifies the content, and sends the content to the computer readable storage medium 78 of the embedded additional user interface 10. In a preferred embodiment, the interface build application 79 not run unless signed.

In one preferred embodiment, the operating system and application files must first pass digital signature verification in order to start the system. The content files must also first pass digital signature verification or the operation of the system is prevented. The boot ROMs are used to enforce the digital signature for the operating system. These boot ROMs contain the "decryption" algorithms for reading and verifying the digital signatures. An example of the DSA digital signature algorithm was presented above. The operating system enforces the digital signature for the content. In order to utilize the content of a desktop application, a digital signature must be first created. Thus, a digital signature is created for the operating system and application files by a desktop application in order for the operation of the system to proceed.

The interface build application 79 is a stable and secure product. In one preferred embodiment, the interface build application 79 displays player information and enables slot players to call for features including, by way of example only, and not by way of limitation: Service, Cocktails, and Change. Additionally, the interface build application 79 enables a casino to display new advertisements to show players, with simple "off the shelf" web development tools. In such an embodiment, this new content can be tailored to current casino events and marketing programs. With more effort, the interface build application 79 enables casinos to change the entire "look and feel" of the graphics interface (interface overlay 110) while running those pages off the processor 30 (or "event engine") of the secure embedded additional user interface, which is an integral part of the embedded additional user interface 10.

In one preferred embodiment, the GMU 65 provides strings in a specified, deterministic XML format, which results in high performance, reliability and manageability. All stored files on the embedded interface storage medium 75 (e.g., COMPACT FLASH card 75) are managed by the embedded additional user interface 10 as a network connection. Stored log files are also managed in the same way. In another aspect of one preferred embodiment, all changes made to the storage card are logged by the interface build application 79, which updates the graphics interface overlay 110. Preferably, the detection of the connected portable computing device 78 by the embedded additional user interface 10 and vice-versa is automatic as possible. In one preferred embodiment, on disconnect, after an update, the rebooting of the laptop is required. In another preferred embodiment, detection is completely automatic.

In one preferred embodiment, extension of the dictionary components enables the execution of custom applications and components. This enablement includes security certification to authenticate run permissions.

In one preferred embodiment, the embedded additional user interface 10 has an incorporated hardware watchdog component. Preferably, multiple threads are set up to run. Essentially, a thread is a program counter, a stack, and a set of registers. All threads run in the same address space of the server application. Multi-threading is a way to let programs do more than one thing at a time. When implemented within a single program running on a system, multi-threading may involve an operating system allowing programs to split tasks between multiple threads of execution. On a machine with multiple processors, these threads can execute concurrently, potentially speeding up the task significantly. Technically, threads are multiple independent execution streams within a process forming the basic unit of dispatch.

In one aspect of one preferred embodiment, four threads are running. Each thread is designed to a one-time register (i.e., sign in) with the watchdog, and signal the watchdog periodically. If the thread does not signal the watchdog as intended, then the watchdog restarts that thread. In this manner, if a of the threads stops processing for some reason, the thread is restarted and the user never becomes aware of the problem. In one preferred embodiment, there are three worker threads running (plus a main User Interface (UI) thread.) The first thread is the logger thread. If this terminates, memory is used until exhausted. The second thread is the display thread. If this terminates, messages from the GMU 65 are no longer processed and the Web display appears to hang (i.e., crash in such a way that the computer does not respond to input). The third thread is the COMMI$^2$C thread. If this terminates, messages are no longer processed from the GMU 65, rather only from further upstream in the system.

Consequently, in an aspect of one preferred embodiment, a casino attendant is not required to watch for an embedded additional user interface 10 having stopped processing at the attract screen (which is something that would be nearly impossible to notice unless a player card was in) since the hardware watchdog restarts a hung thread.

Figure 10:
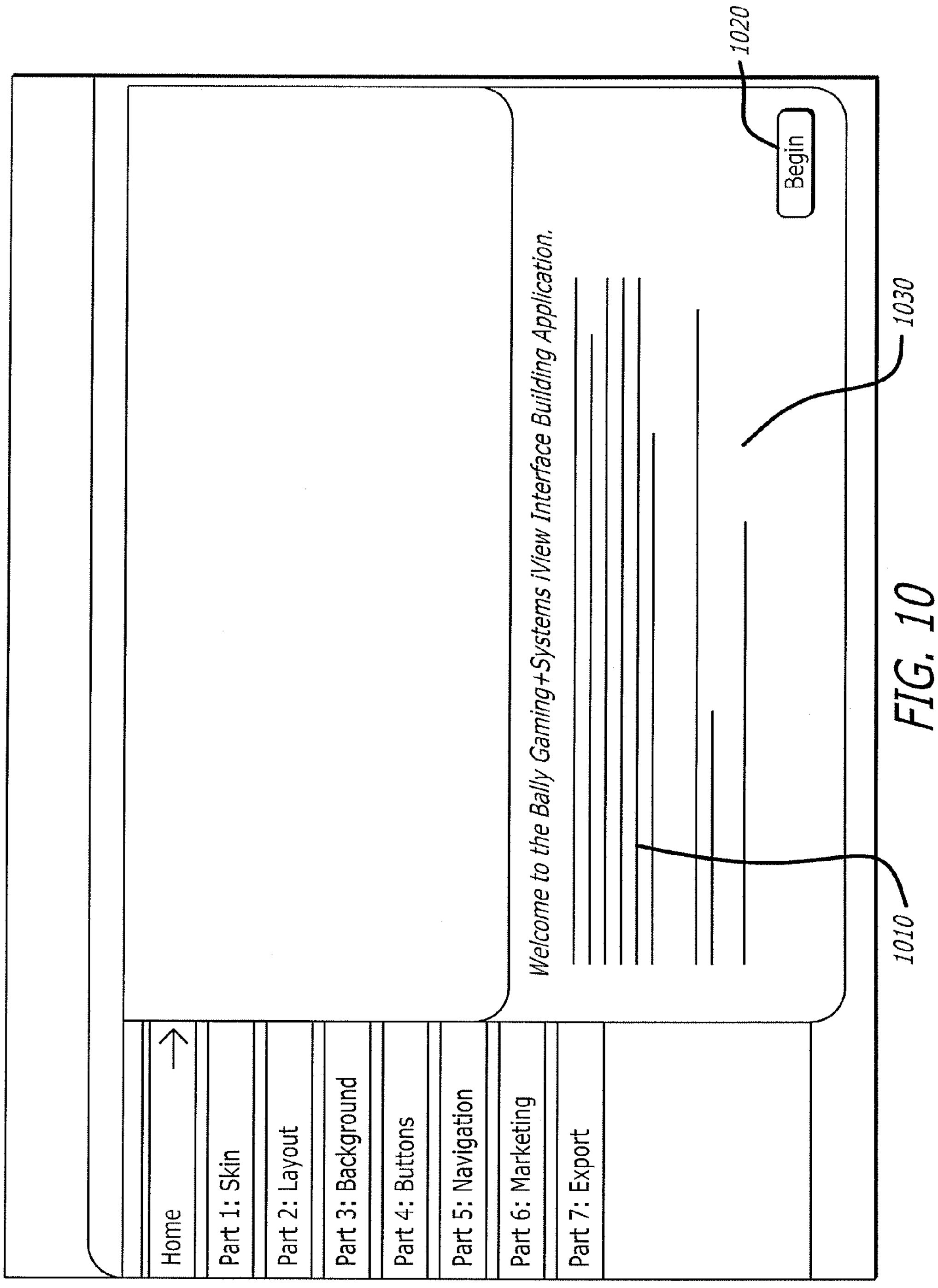
FIG. 10 illustrates a preferred embodiment of the home page for the interface build application.

Referring now to FIGS. 10-17, operation the build application 79 of the user interface 10 can be further explained. These figures illustrate a preferred embodiment of the interface build application 79. Specifically, FIGS. 10 shows a home screen for the interface build application 79. Preferably, a welcome and instructional message 1010 is displayed. When the user is ready to begin, a begin button 1020 is touched on the touch-screen 1030, or a mouse left button is depressed with the mouse cursor pointed to a button. In the following described embodiment, a touch screen is utilized; however, those of ordinary skill in the art will appreciate that in another preferred embodiment, a mouse may be used as an input device without departing from the scope of claimed invention.

Figure 11:
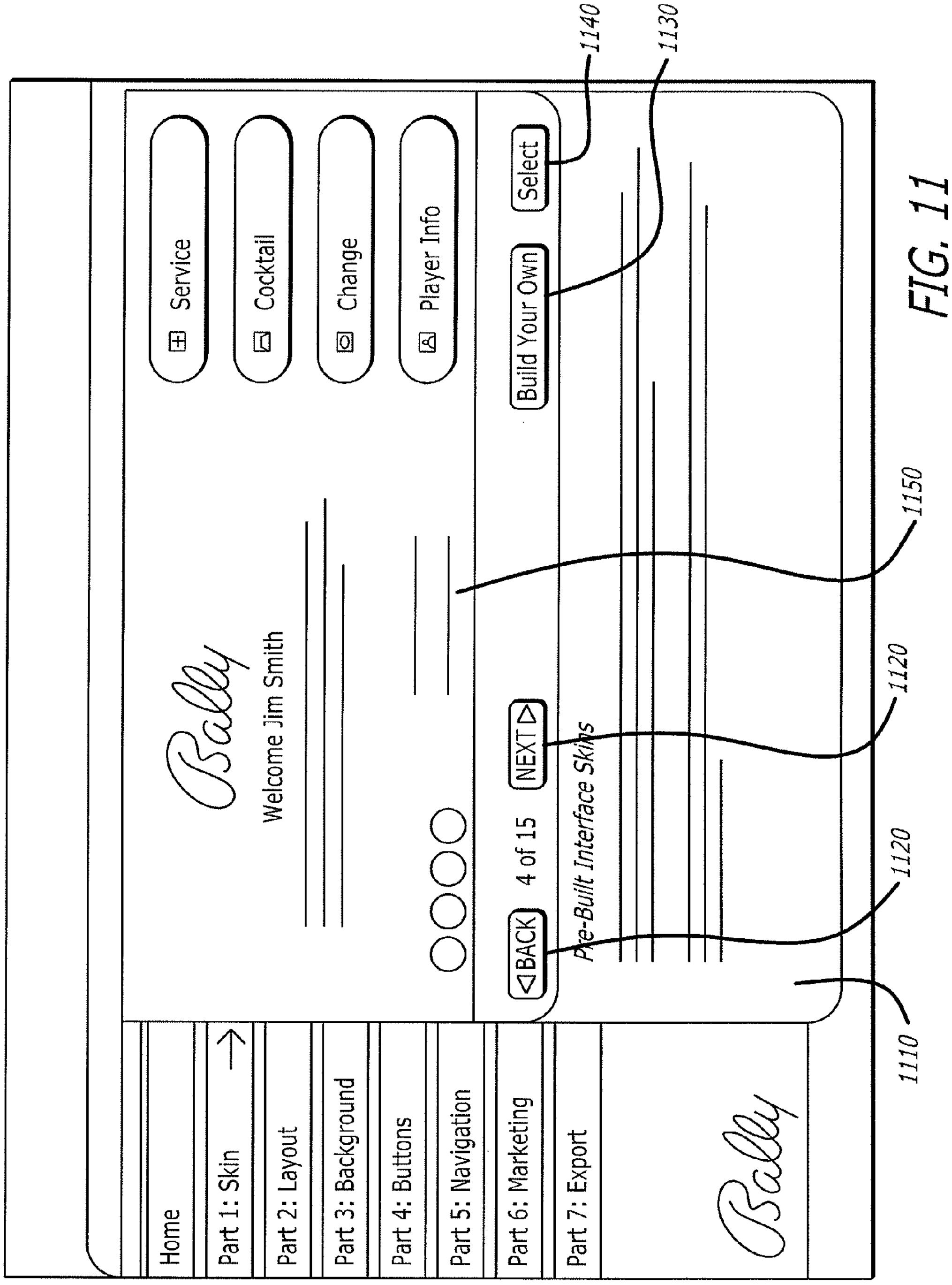
FIG. 11 illustrates a preferred embodiment of the interface for selection of pre-built interface overlays for the interface build application.

Referring now to FIG. 11, a pre-built interface overlay selection screen is shown. In one preferred embodiment, an instructional message 1110 is displayed. The first step in the interface build application 79 is to browse the pre-built interface overlays 110 that are currently available using browse/scroll buttons 1120. Preferably, the user is able to scroll through all available pre-built interface overlays 1150. As new interface overlays 110 are developed, the overlays are added to a directory and are automatically available to the application 79. After viewing all of the available interface overlay designs 1150, the user can either choose one of the pre-built interface overlay 110 by selecting a "Select" button 1140, or choose to build a custom interface overlay by selecting a "Build-Your-Own" button 1130. If a pre-built interface overlay 1150 is selected, the interface build application 79 skips to the actions described with respect to FIG. 15.

Figure 12:
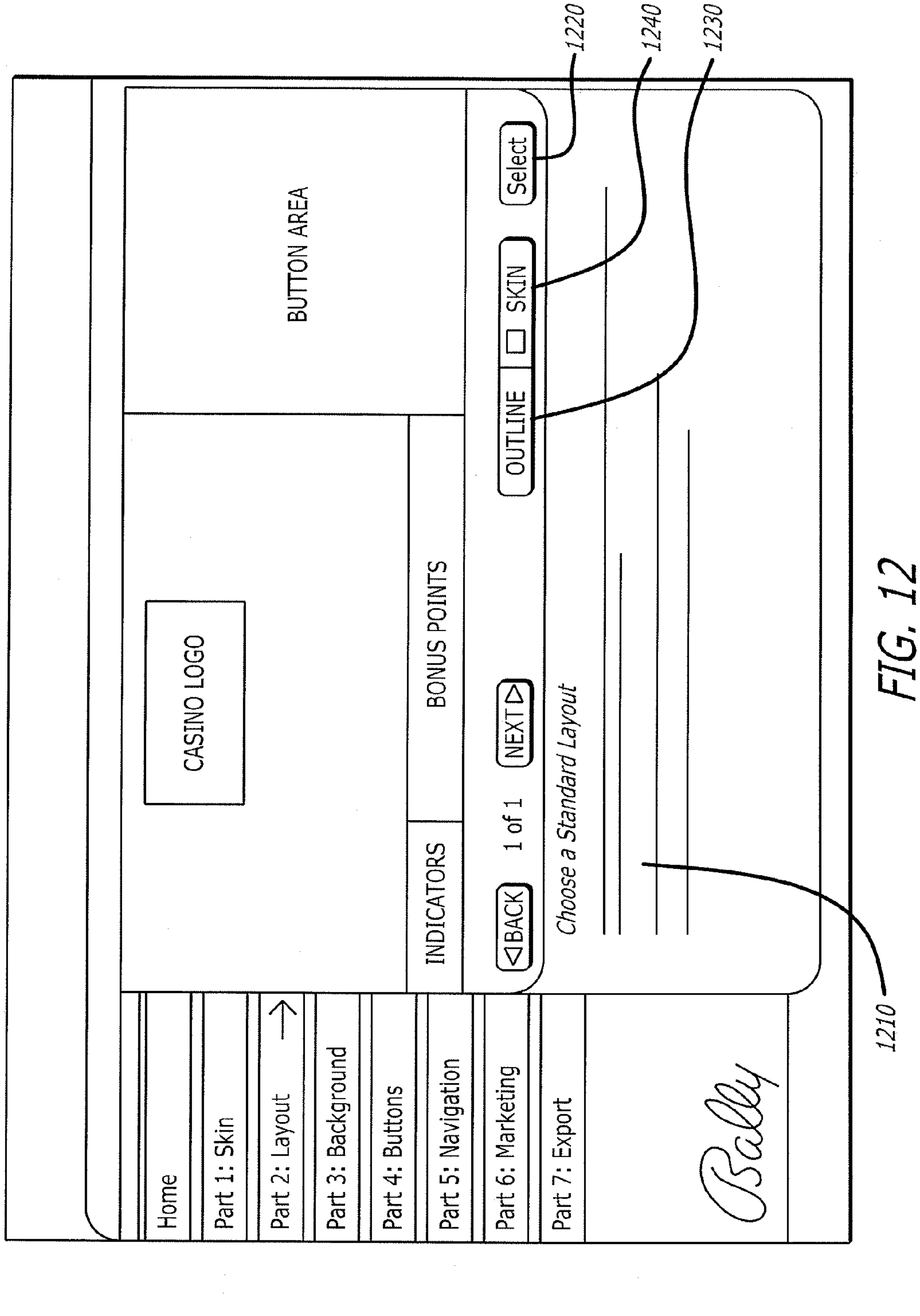
FIG. 12 illustrates a preferred embodiment of the interface for selection of a standard layout for a custom-built interface overlay for the interface build application.

Referring now to FIG. 12 a custom layout selection screen is shown. If a user decides to create a custom interface overlay, the next step is to select a layout. Preferably, an instructional message 1210 is shown. In a preferred embodiment, the user is able to scroll through all of the available layout styles 1240. The initial view is a wire-frame view that shows how the information is organized in the layout. By switching a toggle 1230 to the right, the wire-frame view is changed to a rendered design sample of the layout. Much like the rest of the assets, when new layouts 1220 are selected and added to a directory, new layouts are automatically available to the application.

Figure 13:
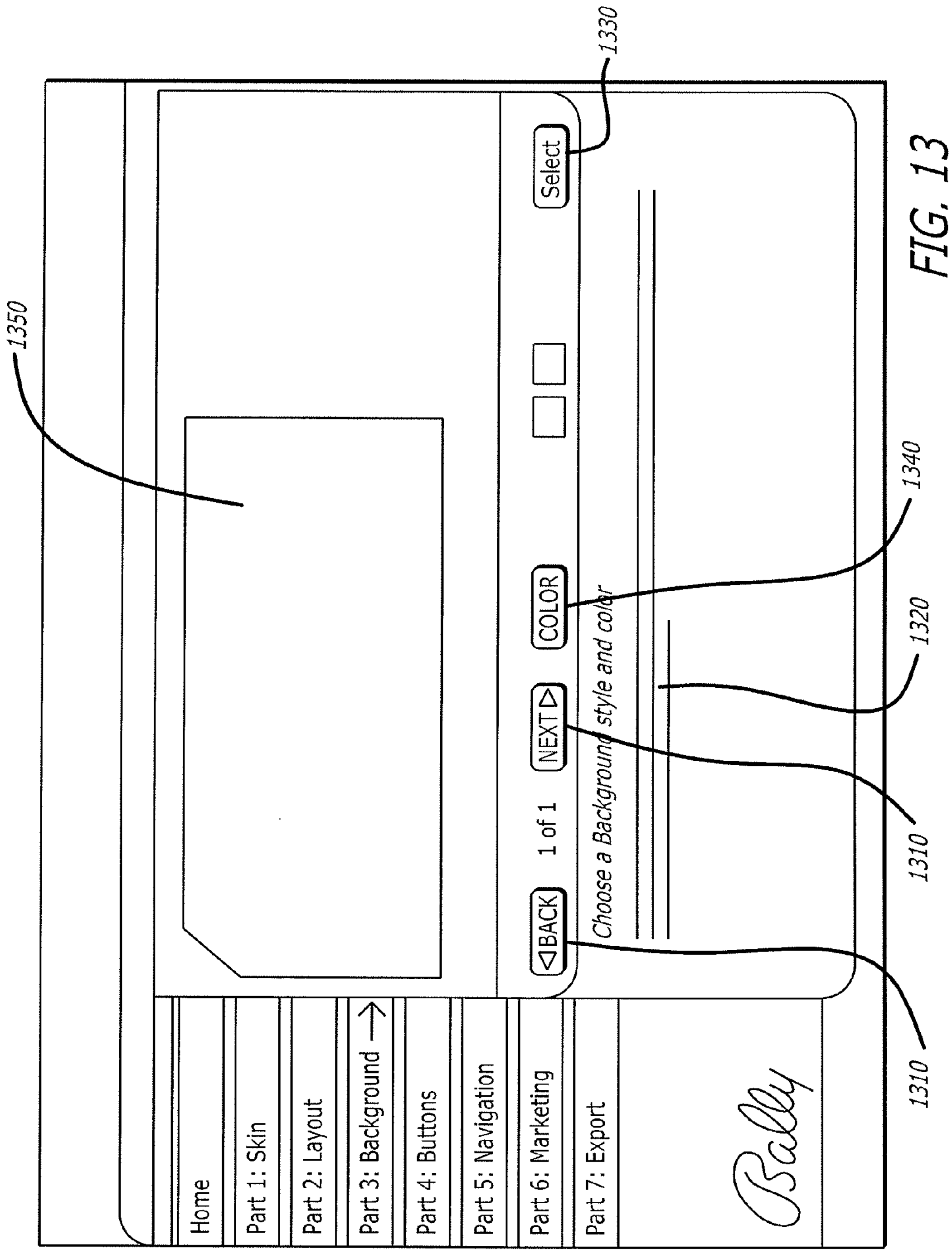
FIG. 13 illustrates a preferred embodiment of the interface for selection of background style and color for a custom-built overlay interface for the interface build application.

Referring now to FIG. 13, a custom background styles and colors selection screen is shown. Preferably, an instructional message 1320 is shown. In a preferred embodiment, browse/scroll touch buttons 1310 are provided for viewing the choices of background image and color 1350. Once a layout is selected with the select touch button 1330, the user browses through all of the available background images 1350 available to that layout. At this stage the user has the added ability to select a background image, and then alter the images hue to green, blue, purple, red, or orange by touching a color button 1340.

Figure 14:
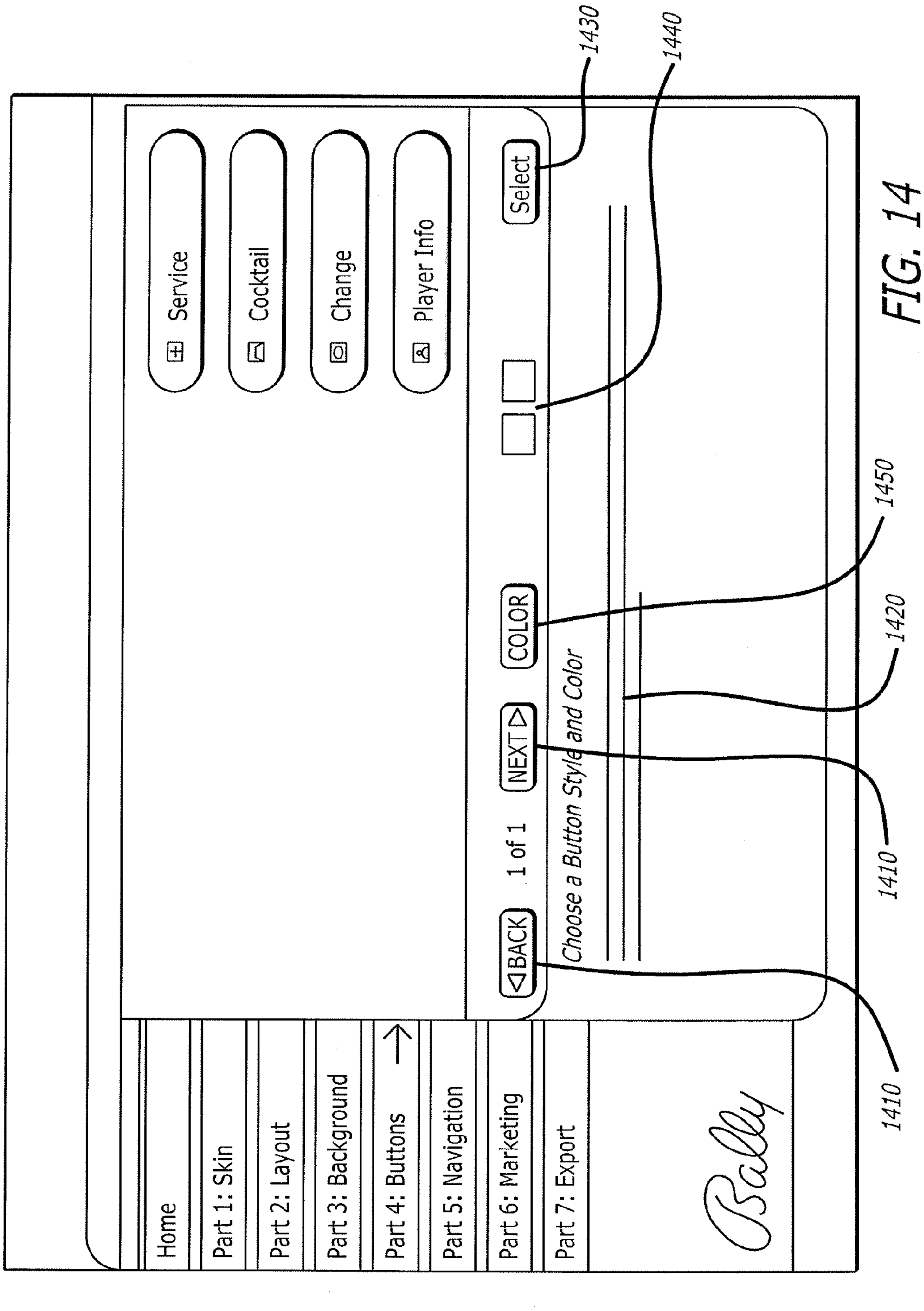
FIG. 14 illustrates a preferred embodiment of the interface for selection of button style and button color for a custom-built interface overlay for the interface build application.

Referring now to FIG. 14, a button style and button color selection screen is shown. Preferably, an instructional message 1420 is included. In a preferred embodiment, after a background image and color have been selected (as described above with reference to FIG. 13), the user browses through all of the button styles 1440 available to the selected layout using the browse/scroll buttons 1410. Preferably, all available button styles 1440 appear directly over the background image that the user selected in the previous step (as described above with reference to FIG. 13). Again, the user selects a button, using a select button 1430, and modifies the button hue, using a color button 1450.

Figure 15:
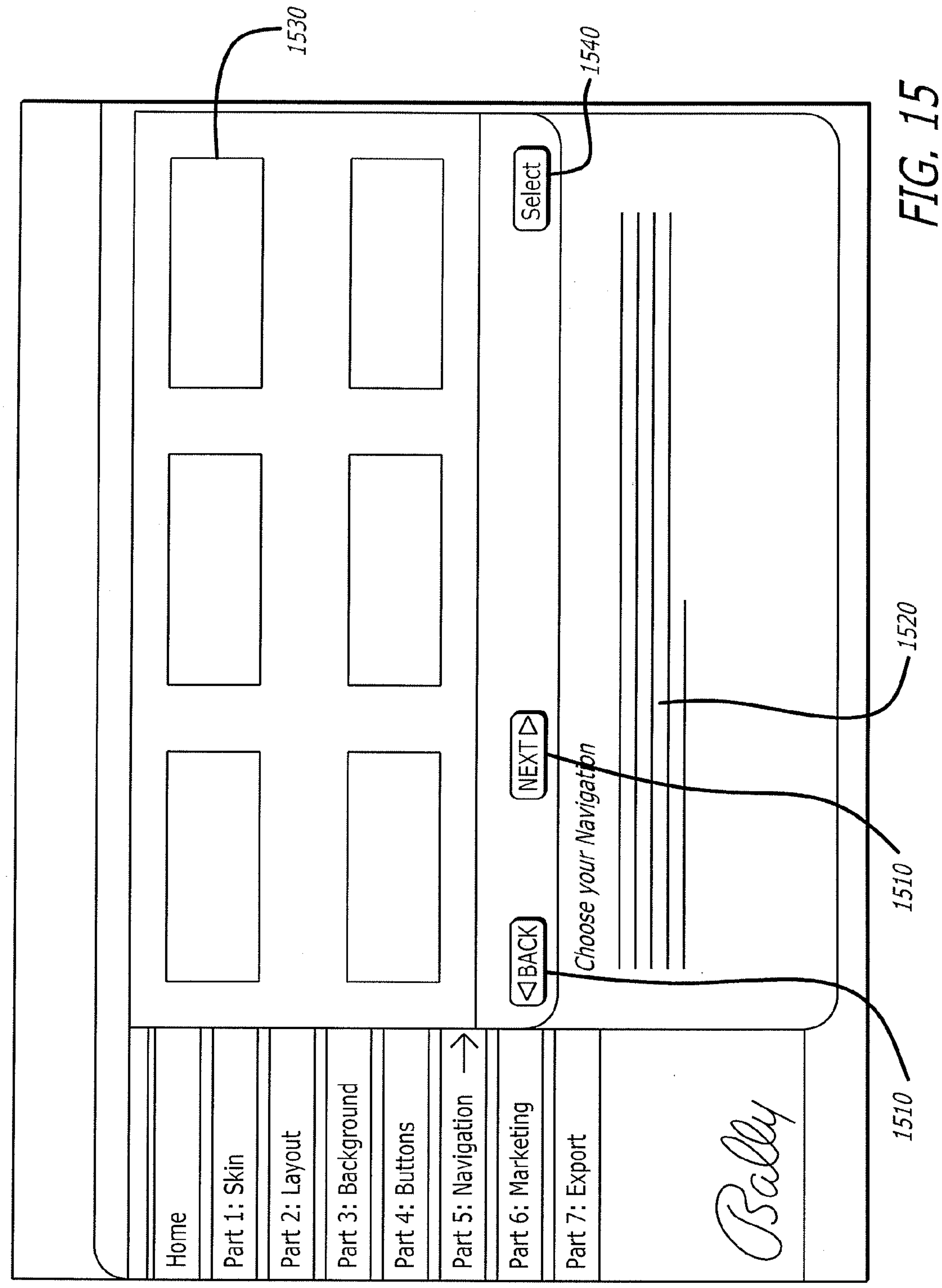
FIG. 15 illustrates a preferred embodiment of the interface for selection of navigation for the interface build application.

Referring now to FIG. 15, a selecting features and navigation screen is shown. Preferably, an instructional message 1520 is provided. In a preferred embodiment, once the overall design of the interface overlay 110 has been decided, the next step is to determine the features of that will be used at the user's installation. In this regard, the user is shown features 1530 that they can select using a select button 1540. The current feature list includes, by way of example only, and not by way of limitation: ePROMO, personal information, change request, service request, cocktail request, bonus points, and countdown. These are browsed/scrolled using the browse/scroll buttons 1510.

As part of an eCash proprietary system, ePROMO enables a game player to withdraw cashable or non-cashable funds from their account that is located on a player-tracking system. Additionally, ePROMO enables the casino to transfer cashable or non-cashable funds to the player at the game.

Figure 16:
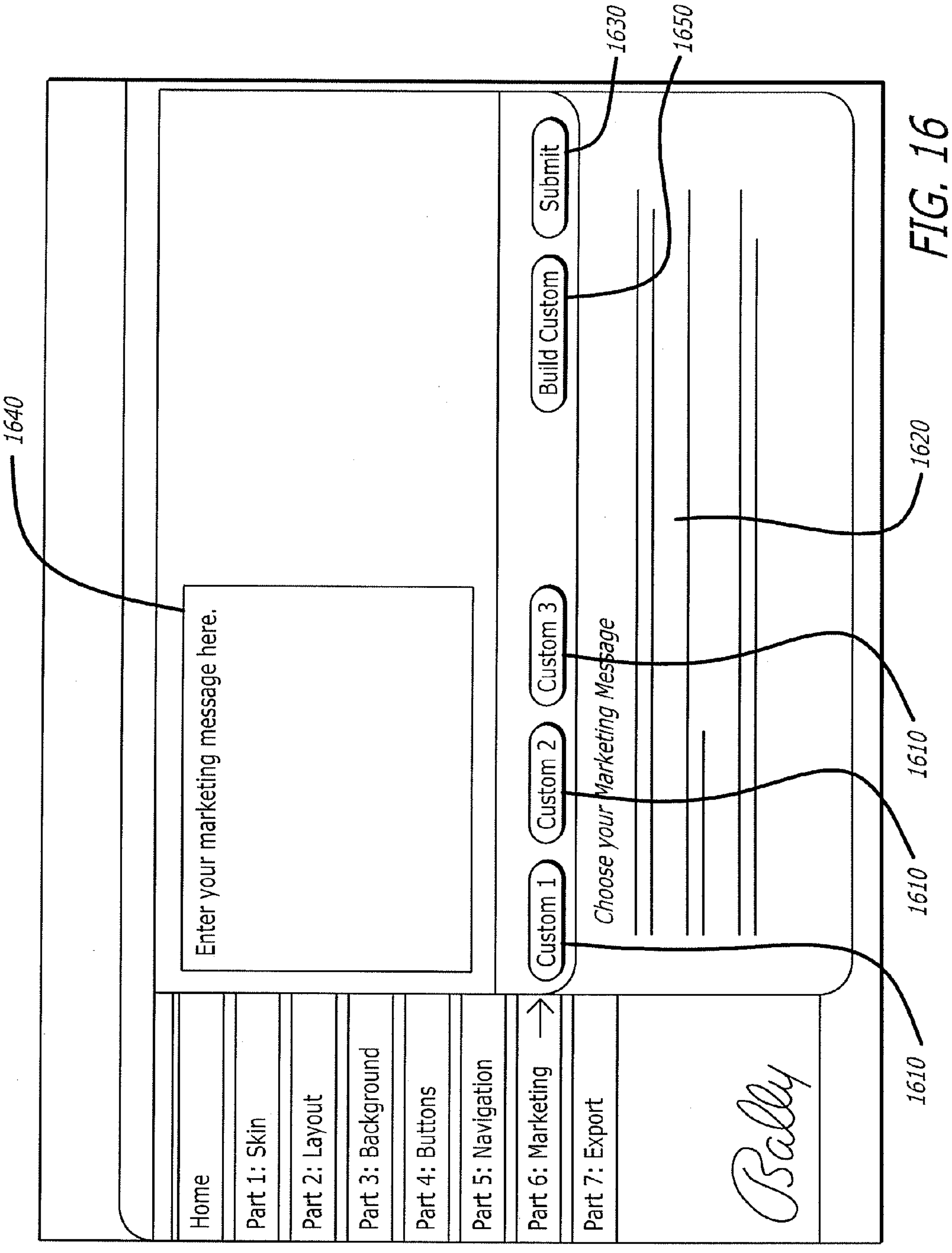
FIG. 16 illustrates a preferred embodiment of the interface for selection of marketing messages for the interface build application.

Referring now to FIG. 16, a marketing message screen is shown. Preferably, an instructional message 1620 is shown. In one preferred embodiment, the user can enter a simple text message by entering text into the text message box 1640. Additionally, the user can instead select, with custom select buttons 1610, from a pre-built set of animated generic messages. The current set of messages includes, by way of example only, and not by way of limitation: birthday, anniversary, generic bonus (fireworks), and first time player. Preferably, a client may choose to have a third party develop a totally customized animated message, by using the build custom button 1650. A submit button 1630 is used to submit a message.

Figure 17:
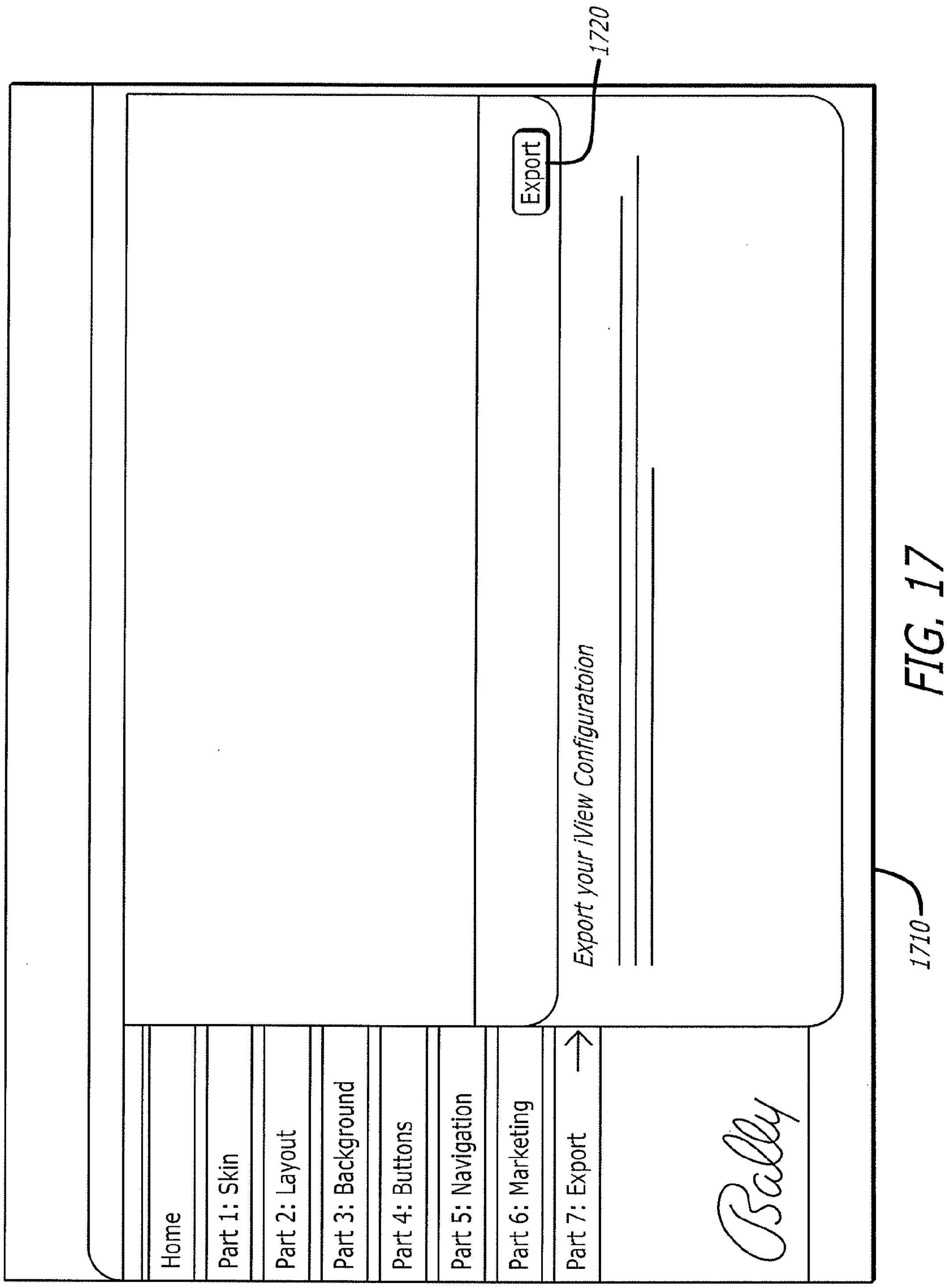
FIG. 17 illustrates a preferred embodiment of the interface for selection of export of the selected interface overlay with navigation and marketing messages of pre-built interface overlays for the interface build application.

FIG. 17 illustrates a final step of exporting a new overlay configuration, pre-built or custom built. Preferably, an instructional message 1710 is shown. By using an export button 1720, a new interface overlay is saved onto a hard disk, available for e-mailing to a third party. In one preferred embodiment, the interface overlay requirements are sent to a third party for development with the appropriate security safeguards, as discussed herein, while in another preferred embodiment, appropriate security safeguards are developed in situ with the appropriate hardware and software.

In one preferred embodiment, player oriented display modes include, by way of example only, and not by way of limitation: Attract Mode, Carded Play Mode. Service Request, Change Request, Cocktail Request, Player Information Request, Player eCash (electronic cash), Balance Request, Player eCash Withdraw Request, Player eCash Deposit Request, and Jackpot Mode, non-English languages, and Assistance Mode for handicapped individuals.

While the selection of display modes in one preferred embodiment is directed toward an interface with the player, in another preferred embodiment, additional display modes are directed toward an interface with an employee. Employee oriented display modes include, by way of example only, and not by way of limitation: Carded Employee Mode, Employee Help Screen, Employee GMU ID Entry, Employee Input Test Mode, Employee Service Entry, Employee Hopper Fill Notification, Employee Display Meters Mode, Employee Display Event Queue Mode, Employee Zero Meters, Employee Start Intrepid, Employee Help Screen, Employee Personality Screen, Employee GMU ID Entry, Employee Input Test Mode, Employee Game Reserve Mode, Employee Service Entry, Employee Hopper Fill Notification, Employee Proactive Fill Request, Employee Display Meters Mode, Employee Display Event Queue Mode, Employee Zero Meters, Employee Start Intrepid, Employee Show Debug, Employee Weighing Hopper Calibration (top-level), Employee Weighing Hopper Calibration (zero), Employee Weighing Hopper Calibration (calibrate), Employee Weighing Hopper Calibration (set calibration coins), Employee Weighing Hopper Calibration (view coins), Employee Weighing Hopper Calibration (set threshold and span), Employee Debug, Employee Ticket Maintenance (top-level), Employee Ticket Maintenance (view redemption errors), Employee Ticket Maintenance (view print errors), Employee Ticket Maintenance (reset errors), Employee Ticket Maintenance (toggle view mode), Employee Ticket Maintenance (view print records), Employee Authentication Mode, Employee eCash Log, Employee Call 911, Employee Project Info, Option Chip, Date/Time Set, and Compact Flash Update.

A preferred embodiment of the interface build application 79 provides casino game owners with the capability to rapidly develop and update displays associated with the various casino games, including displaying simple and animated advertising messages. One important factor in the world of casino game machines today is security. The interface build application 79 of the claimed invention is directed toward providing a proper level of security.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A system for creation and verification of video display content for gaming machines that incorporates an embedded user interface, a gaming machine having a display screen for displaying system functions and content, said system comprising:

a computer having at least one processor and in communication with a network;

a content creation component running on the at least one processor in communication with the embedded user interface via the network, wherein the content creation component facilitates creating new content, and wherein the new content customizes and enhances the display screen and the content creation component creates new content that is displayed as an interface overlay;

a configuration creation component running on the at least one processor in communication with the embedded user interface via the network, wherein the configuration creation component facilitates modification of existing content into a new configuration, and wherein the new configuration customizes and enhances the display screen and the configuration component modifies existing content that is displayed as an interface overlay;

a digital signature creation component running on the at least one processor in communication with the embedded user interface via the network, wherein the digital signature creation component creates a new digital signature for verification of the new content and the new configuration to be displayed as an interface overlay on the display screen;

a data log file;

a binding security component for creating a cryptographic signature based at least in part upon a bindings group of at least one hardware component and at least one content component of a gaming machine, wherein said hardware and content components each have associated unique identification codes and at least one of said hardware component unique identification codes is randomly determined and at least one of said content component unique identification codes is randomly determined, said unique identification codes of said at least one hardware component and said at least one content component are concatenated to define said bindings group, said binding security component cryptographically operating upon said concatenated group to generate said signature and to store said signature at said data log file;

and a signature comparing component to compare said signature for each gaming machine log entry, altering of a hardware or content component of a gaming machine bindings group changing said signature indicating a change in of one or more components of said bindings group.

2. The system of claim 1, further comprising said binding security component configured for generating said signature by implementing a Public Key Infrastructure.

3. The system of claim 1, further comprising said binding security component configured for generating said signature by a Message Authorization Code, wherein the Message Authorization Code is a key-dependent one-way hash function that enables fast authentication of files at a lower security level than a full signature generation and verification.

4. The system of claim 1, further comprising:

an interface overlay build subsystem;

a subsystem for storing and managing built interface overlays;

a user verification subsystem;

a system verification subsystem; and a downloading subsystem, wherein a buildable interface overlay is built, verified, logged, and downloaded to a computer readable storage medium.

5. The system of claim 1, further comprising:

a computer readable storage media, wherein data content is stored and published to the computer readable storage media.

6. The system of claim 5, wherein the computer readable storage medium is a compact flash card.

7. The system of claim 1, wherein all content on the embedded user interface is authenticated using a gaming machine authentication procedure.

8. The system of claim 1, wherein content on the embedded user interface is authenticated using an electronic bKey, and wherein the bKey is an electronic identifier that is tied to a particular individual.

9. The system of claim 1, wherein the configuration component modifies existing content for player oriented display modes or employee oriented display modes.

10. The system of claim 1, further comprising:

a display application, wherein the display application forms a video display, and wherein the video display includes buttons.

11. The system of claim 1, further comprising:

a video display that includes buttons, wherein the buttons operate by mouse point and click commands.

12. The system of claim 1, further comprising:

a video display that includes buttons, wherein the buttons operate by touching a touch-screen.

13. The system of claim 1, further comprising:

a button configuration component for activating buttons, wherein buttons are activated through user-selection and the active buttons are added to the display application; and a button configuration component for arranging buttons, wherein an arranged order of buttons is user-selected and the button arrangement is added to the display application.

14. The system of claim 1, further comprising:

a video display with a video displayed logo, wherein the logo is user-selectable; and a logo addition component, wherein the logo addition component enables a logo version to be displayed at the video display.

15. The system of claim 1, further comprising:

an export application, wherein the export application enables building a new instance of a display application that is transferable to a portable memory storage device; and an integrated marketing component, wherein a selected design layout, selected graphics, and selected text are bundled together and are exported using the export application.

16. The system of claim 1, further comprising: user-selectable design layouts, user-selectable graphics, and user-selectable text.

17. The system of claim 1, further comprising: downloadable content, wherein the downloadable content is transferred to the embedded user storage device via a compact flash card.

18. The system of claim 1, further comprising: downloadable content, wherein a user-created interface overlay is downloaded over a network.

19. The system of claim 1, further comprising: downloadable content, wherein a user-created interface overlay is downloaded over the Internet.

20. The system of claim 1, further comprising:

a management subsystem for buildable interface overlays, wherein buildable interface overlays are enabled by available interface overlay components; and a storage subsystem for storing buildable interface overlays, wherein the storage subsystem is a computer readable storage medium.

21. The system of claim 1, further comprising: a web page information presentation, wherein the web page information presentation is displayed to a user via the embedded user interface display screen.

22. The system of claim 1, further comprising:

a user reconfiguration component, wherein the user reconfiguration component enables reconfiguration of the graphical appearance of displayed views;

a user customization component, wherein the user customization component enables customization of a set of templates;

a user addition component, wherein the user addition component enables user-addition of logos, artwork, and text;

a user rearrangement component, wherein the user rearrangement component enables user-rearrangement of screens buttons;

a user color selection component, wherein the user color selection component enables color selection by a user; and a user enablement component, wherein the user enablement component facilitates enablement of features by a user.

23. The system of claim 1, further comprising:

an application results component, wherein the application results component ensures that application results are sent directly to a server;

an application content signing component, wherein the application content signing component ensures that application content is signed by the server;

an application content certification component, wherein the application content certification component ensures that application content is certified by the server; and an application contents transfer component, wherein the application contents transfer component ensures that application contents are storably transferred to a computer readable storage medium.

24. A system for creation and verification of content and components for gaming machines of the type including a (i) game display, (ii) hardware and software components for operating the gaming machine, a plurality of hardware and software components each assigned unalterable identification numbers, the system comprising:

embedded additional user interfaces disposed at said gaming machines on one or more of said game display or on a separate user interface display configured to display interface content to a user of each gaming machine;

a computer having at least one processor and in communication with a network;

a content creation component running on the at least one processor in communication with the embedded additional user interfaces via the network, wherein the content creation component facilitates providing content, and wherein the content alters the display of interface content at said one or more of said game displays or separate user interface displays;

a digital signature creation component running on the at least one processor in communication with the embedded additional user interfaces via the network, wherein the digital signature creation component creates a digital signature for verification of the content to be displayed;

a binding security component for creating a cryptographic message based upon a bindings group that includes a group of at least one of said hardware component identification numbers and at least one of said software component identification numbers for each gaming machine combined into said group and said group cryptographically acted upon to generate said message, at least one of said hardware component identification numbers of said bindings group is determined randomly and at least one of said software component identification numbers of said bindings group is determined randomly; and a message comparing component to compare said messages for each gaming machine, altering of a hardware or software component of a gaming machine bindings group creating a message indicating a change in of one or more components of said bindings group.

25. A method for creation and verification of content and components for gaming machines of the type including a (i) game display, (ii) hardware and software components for operating the gaming machine, a plurality of hardware and software components each assigned unalterable identification numbers, the method comprising:

providing additional user interfaces at said gaming machines, on one or more of said game display or on a separate user interface display configured to display user interface content to a user of each gaming machine;

providing a content creation component executed by a processor in communication with the embedded additional user interfaces via a network, the content creation component facilitates providing content, and wherein the content alters the display of user interface content at said one or more of said game displays or separate user interface display of one or more gaming machines;

providing a digital signature creation component executed by a processor in communication with the embedded additional user interfaces via the network, the digital signature creation component creating a digital signature for verification of the content to be displayed;

furnishing a binding security algorithm for creating a cryptographic message based upon a bindings group that includes a group of at least one of said hardware component identification numbers and at least one software component identification numbers for each gaming machine cryptographically combined to generate said message, at least one of said hardware component identification numbers of said bindings group is randomly determined and at least one of said software component identification numbers of said bindings group is randomly determined; and providing for a message comparing component to compare said messages for each gaming machine, altering of hardware or software components of a gaming machine bindings group creating an message indicative of a change in of one or more components of said bindings group.

* * * * *

UNITED STATES PATENT AND TRADEMARK OFFICE

CERTIFICATE OF CORRECTION

PATENT NO. : 8,568,225 B2
APPLICATION NO. : 11/225494
DATED : October 29, 2013
INVENTOR(S) : James W. Morrow, Carmen DiMichele and Daniel D. Kopycienski It is certified that error appears in the above-identified patent and that said Letters Patent is hereby corrected as shown below:

In the Specification

Column 20, Line 6, delete “a of” after “if”

Signed and Sealed this
Eighth Day of April, 2014

Michelle K. Lee

Michelle K. Lee
*Deputy Director of the United States Patent and Trademark Office*